US012646856B2

(12) United States Patent
Nomoto et al.

(10) Patent No.: US 12,646,856 B2
(45) Date of Patent: Jun. 2, 2026

(54) RADIO WAVE REFLECTOR

(71) Applicant: SEKISUI CHEMICAL CO., LTD, Osaka (JP)

(72) Inventors: Hiroyuki Nomoto, Osaka (JP); Yasuaki Ide, Osaka (JP); Munehiro Hatai, Osaka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 169 days.

(21) Appl. No.: 18/724,834

(22) PCT Filed: Dec. 23, 2022

(86) PCT No.: PCT/JP2022/047519
§ 371 (c)(1),
(2) Date: Jun. 27, 2024

(87) PCT Pub. No.: WO2023/127710
PCT Pub. Date: Jul. 6, 2023

(65) Prior Publication Data

US 2025/0105525 A1 Mar. 27, 2025

(30) Foreign Application Priority Data

Dec. 27, 2021 (JP) ................................ 2021-213216
Aug. 2, 2022 (JP) ................................ 2022-123576

(51) Int. Cl.
*H01Q 15/14* (2006.01)

(52) U.S. Cl.
CPC .................................. *H01Q 15/14* (2013.01)

(58) Field of Classification Search
CPC . B32B 7/02; B32B 7/025; H01Q 1/00; H01Q 1/007; H01Q 1/24; H01Q 1/241;
(Continued)

(56) References Cited

U.S. PATENT DOCUMENTS 4,763,133 A 8/1988 Takemura et al.
11,980,013 B2 * 5/2024 Ohkoshi .............. B32B 27/325
(Continued)

FOREIGN PATENT DOCUMENTS

JP 2010-258514 11/2010
WO 2022/163813 8/2022

OTHER PUBLICATIONS

International Search Report issued Mar. 7, 2023 in International (PCT) Application No. PCT/JP2022/047519.
(Continued)

*Primary Examiner* — Tho G Phan
(74) *Attorney, Agent, or Firm* — Wenderoth, Lind & Ponack, L.L.P.

(57) ABSTRACT

Provided is a radio wave reflector that can reflect radio waves while the intensity thereof is maintained and that can maintain the scenery. The radio wave reflector of the present invention is a radio wave reflector for reflecting radio waves, wherein the intensity of a reflective wave as specular reflection of an incident wave is −30 dB or more relative to the intensity of the incident wave at a frequency, and the radio wave reflector has a total light transmittance of 65% or more as measured using a standard illuminant D65.

9 Claims, 8 Drawing Sheets

(58) Field of Classification Search
CPC .... H01Q 15/00; H01Q 15/0013; H01Q 15/14; H01Q 19/10
See application file for complete search history.

(56) References Cited

U.S. PATENT DOCUMENTS

| | | | | |
|---|---|---|---|---|
| 12,132,254 | B2 * | 10/2024 | Nakanishi | B32B 7/025 |
| 12,155,128 | B2 * | 11/2024 | Kalateh | H01Q 15/147 |
| 12,257,821 | B2 * | 3/2025 | Shinagawa | B32B 27/065 |
| 12,506,265 | B2 * | 12/2025 | Suheil | H01Q 1/24 |
| 2017/0150659 | A1 | 5/2017 | Uprety et al. | |
| 2024/0088570 | A1 | 3/2024 | Nomoto et al. | |

OTHER PUBLICATIONS

"Newly Developed Transparent and Flexible Radio Wave Reflection Film for 5G Communications—Will improve radio wave communications infrastructure without spoiling landscape", Dec. 15, 2021, pp. 1-4, cited in ISR & CD.
Kitayama, "Research of Transparent RIS Technology toward 5G evolution & 6G", NTT DOCOMO Technical Journal, Jul. 2, 2021, vol. 29, No. 2, pp. 15-23, cited in ISR & CD.
Notice of Reasons for Refusal mailed Nov. 8, 2022 in corresponding Japanese Patent Application No. 2022-114291, with English translation.
Extended European Search Report issued Nov. 11, 2025 in corresponding European Patent Application No. 22915933.0.

* cited by examiner (A)

(B)

RADIO WAVE REFLECTOR

TECHNICAL FIELD

The present invention relates to a radio wave reflector for reflecting radio waves.

BACKGROUND ART

Cellular phones and wireless communications use radio waves in the frequency band of about 2 GHz or more and 300 GHz or less. Since such radio waves with a short wavelength have high straight-advancing properties, and circumvention is difficult even in the presence of obstacles, reflectors are provided on the surfaces of buildings such as walls, floors, ceilings, and pillars (hereinafter referred to as a "wall etc."), to deliver radio waves over a wide area of space. For example, Patent Literature (PTL) 1 proposes a communication system in which a monopole antenna and a metal reflector for reflecting radio waves are arranged in an underfloor space within a building. In PTL 1, radio waves emitted from the monopole antenna are diffused in the underfloor space by the reflector while the radio waves are prevented from leaking from the underfloor space to the outside of the living room (the building) or from being absorbed on the floor of the building.

CITATION LIST

Patent Literature

PTL 1: JP2010-258514A

SUMMARY OF INVENTION

Technical Problem

Metal reflectors for reflecting radio waves are typically composed of a metal plate, such as aluminum or copper. Although metal reflectors reflect radio waves having a short wavelength with high intensity in the specular reflection direction, it is known that they are unlikely to diffusely reflect radio waves, making it difficult to deliver radio waves over a wide area of space. In addition, metal reflectors are typically opaque. Specifically, one side of a metal reflector cannot be visually recognized when viewed from the other side. Thus, such a metal reflector is conspicuous when used in a living room and blocks the line of sight when used in a window, which obstructs the indoor atmosphere and worsens the scenery.

The present invention has been accomplished in view of the problems described above. An object of the present invention is to provide a radio wave reflector that can reflect radio waves while the intensity thereof is maintained and that can maintain the scenery.

Solution to Problem

To achieve the above object, the present invention encompasses the subject matter described in the following Items.

Item 1. A radio wave reflector for reflecting radio waves,
- the intensity of a reflective wave as specular reflection of an incident wave being −30 dB or more relative to the intensity of the incident wave at a frequency, and
- the radio wave reflector having a total light transmittance of 65% or more as measured using a standard illuminant D65.

Item 2. The radio wave reflector according to Item 1, wherein the incident wave has any frequency of 2 GHz or more and 300 GHz or less.

Item 3. The radio wave reflector according to Item 1, wherein
- the radio wave reflector comprises a conductive thin film layer comprising an electric conductor for reflecting radio waves, a substrate layer comprising a substrate, a protective layer comprising a protective material for protecting the conductive thin film layer, and an adhesive layer comprising an adhesive for bonding the conductive thin film layer and the protective layer, and
- the substrate layer, the conductive thin film layer, the adhesive layer, and the protective layer are laminated in this order.

Item 4. The radio wave reflector according to Item 3, wherein the conductive thin film layer has a surface resistivity of 3.5Ω/□ or less and a thickness of 500 nm or less.

Item 5. The radio wave reflector according to Item 3 or 4, wherein in the conductive thin film layer, regions without the electric conductor surrounded by one or a plurality of the electric conductors that are linear are periodically arranged at predetermined intervals.

Item 6. The radio wave reflector according to Item 5, wherein the conductive thin film layer has an electric conductor coverage of 1% or more and 10% or less, the electric conductor coverage being defined as the percentage of the area occupied by the electric conductor per unit area.

Item 7. The radio wave reflector according to Item 5 or 6, wherein the electric conductor has a line width of 0.1 μm or more and 4.0 μm or less.

Item 8. The radio wave reflector according to any one of Items 1 to 7, wherein the overall shape of the radio wave reflector is a polygonal shape having a one-side length of 15 cm or more.

Item 9. The radio wave reflector according to any one of Items 3 to 7, wherein the protective layer is subjected to anti-glare treatment or anti-reflection treatment.

Advantageous Effects of Invention

The present invention provides a radio wave reflector that can reflect radio waves while the intensity thereof is maintained and that can maintain the scenery.

BRIEF DESCRIPTION OF DRAWINGS

FIG. 3(A) is a plan view, and FIG. 3(B) is an enlarged view of the portion A in FIG. 3(A).

DESCRIPTION OF EMBODIMENTS

Overall Configuration

Figure 1:
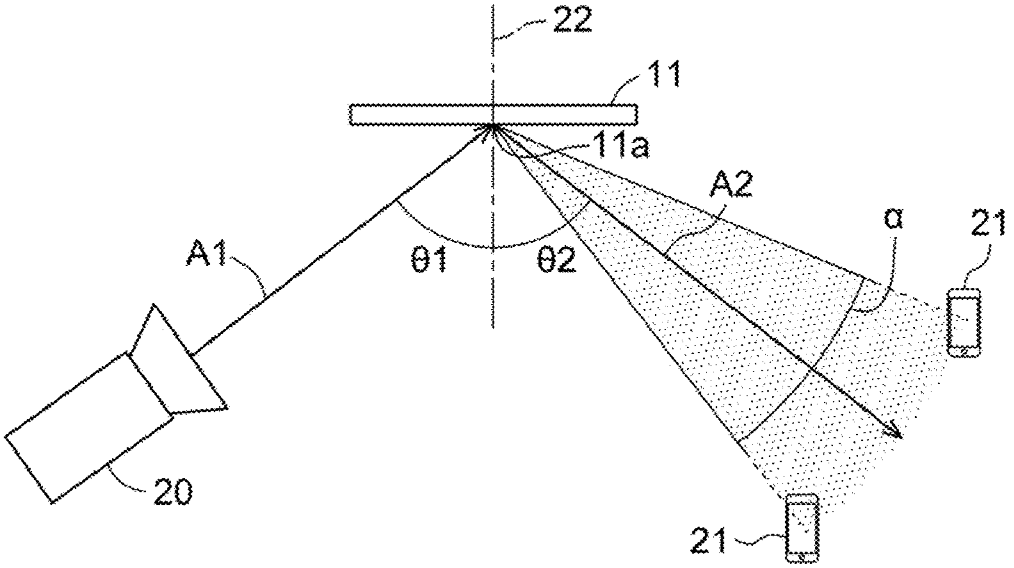
FIG. 1 is a diagram for explaining the angle range of reflective wave reflected from a radio wave reflector according to one embodiment of the present invention.

Embodiments of the present invention are described with reference to the drawings. As shown in FIG. 1, a radio wave reflector 11 of the present invention reflects radio waves output from a radio wave source 20, and the reflected reflective waves are received by a receiver 21. The radio wave source 20 is, for example, a communication apparatus with a transmitting antenna capable of transmitting radio waves. The receiver 21 is a communication device with a receiving antenna capable of receiving radio waves. Examples of the receiver 21 include smartphones, cellular phones, tablet computing devices, laptop PCs, portable game consoles, repeaters, radios, and televisions.

The radio wave reflector 11 comprises an electric conductor 12 for reflecting radio waves. The radio wave reflector 11 is caused to reflect a radio wave at any frequency of the incident wave of 2 GHz or more and less than 6 GHz, 6 GHz or more and less than 20 GHz, 20 GHz or more and less than 60 GHz, 60 GHz or more and less than 100 GHz, 100 GHz or more and less than 150 GHz, or 150 GHz or more or 300 GHz or less, with the radio wave reflector 11 attached to a wall etc. and being in a flat state. The incident angle of the incident wave is at least a predetermined angle in the range of 15 degrees or more and 75 degrees or less, preferably 45 degrees, and more preferably all of the angles in the range of 15 degrees or more and 75 degrees or less. In this case, the intensity of the reflective wave as specular reflection of the incident wave from the radio wave reflector 11 (also referred to below as the "specular reflection intensity") is −30 dB or more relative to the incident wave at least at one frequency. Preferably, at a frequency of 28.5 GHz, the specular reflection intensity is −30 dB or more and 0 dB or less relative to the incident wave. More preferably, in the entire frequency band of 20 GHz or more and 60 GHz or less, the specular reflection intensity is −30 dB or more and 0 dB or less relative to the incident wave. Even more preferably, in the entire frequency band of 2 GHz or more and 300 GHz or less, the specular reflection intensity is −30 dB or more and 0 dB or less relative to the incident wave. The phrase "specular reflection intensity" refers to the reflection intensity that is the intensity with which a radio wave is reflected and that is the intensity of the reflective wave as specular reflection of the incident wave. The term "flat" means a state in which there is no unevenness and no curves, or a state in which the curvature radius at any point on the surface is 1000 mm or more even if there is unevenness.

The specular reflection intensity is preferably −25 dB or more and 0 dB or less, more preferably −22 dB or more and 0 dB or less, even more preferably −20 dB or more and 0 dB or less, and still even more preferably −15 dB or more and 0 dB or less, relative to the incident wave. When the specular reflection intensity is −30 dB or more relative to the incident wave, the radio wave reflector 11 can reflect radio waves while the reflection intensity is kept high, and the receiver 21 can receive radio waves with an intensity that is practical for use. In this embodiment, the specular reflection intensity and the reflection intensity are values obtained when the distance between the reflection point 11*a* of the radio wave reflector 11 and the radio wave source 20, and the distance between the reflection point 11*a* of the radio wave reflector 11 and the receiver 21, are each set to 1 m.

Referring to FIG. 1, specular reflection means that the incident angle θ1 of an incident wave and the reflection angle θ2 of a reflective wave are equal to each other when a radio wave emitted from the radio wave source 20 (a transmitting antenna) is reflected from the radio wave reflector 11. The direction in which a reflective wave travels when a radio wave is specularly reflected is also called the "specular reflection direction." The incident angle θ1 is an angle formed by an incident wave traveling in the incident direction in which a radio wave is incident on the radio wave reflector 11 (indicated by an arrow A1 in FIG. 1) and a normal line 22 of the reflective surface of the radio wave reflector 11, while the reflection angle θ2 is an angle formed by a reflective wave traveling in the reflection direction (indicated by an arrow A2 in FIG. 1) and the normal line 22 of the reflective surface. The normal line 22 is a straight line perpendicular to the tangent line (or the tangent plane) at the reflection point 11*a*. The intensity of the reflective wave may be hereinafter referred to as "reflection intensity."

In the radio wave reflector 11, in a virtual plane including the incident direction of the incident wave and the reflection direction of the reflective wave, the kurtosis of distribution of intensity of the reflective wave at each reception angular position is preferably −0.4 or less when the reception angular positions of the reflective wave are varied within an angle range α of −15 degrees or more and +15 degrees or less with respect to the specular reflection direction of the radio wave. The kurtosis is more preferably −1.0 or less, even more preferably −1.1 or less, and still even more preferably −1.2 or less. The lower limit of the kurtosis is not particularly limited and is typically about −0.5. The virtual plane can also be referred to as a plane including the reflection point 11*a* on the reflective surface of the radio wave reflector 11, the radio wave source 20, and the receiver 21 of the reflective wave. The kurtosis is determined with the radio wave reflector 11 attached to a wall etc. and being in a flat state.

Kurtosis is a statistic that expresses how much a distribution deviates from the normal distribution, and indicates the degree of peakedness and the heaviness of its tail. As shown in FIG. 1, it is assumed that a radio wave output from the radio wave source 20 is incident on the radio wave reflector 11 at a predetermined incident angle θ1. Then, a reflection intensity x is measured by moving a reception angular position i of the receiver 21 by a predetermined angle each (e.g., 5 degrees each) from the specular reflection direction of the radio wave with the reflection point 11*a* being set as the center, within the angle range α of −15 degrees or more and +15 degrees or less with respect to the specular reflection direction of the radio wave. The reception angular position i of the receiver 21 is located on an arc from the reflection point 11*a* set as the center. The kurtosis is calculated according to the following formula when the average value of the values of the reflection intensity at each reception angular position i $x_i$ (i: 1,2, . . . ,n)

is $\ddot{x}$, and the standard deviation is s.

$$\text{Kurtosis} = \frac{n(n+1)}{(n-1)(n-2)(n-3)}\sum_{i=1}^{n}\frac{(x_i-\bar{x})^4}{S^4} - \frac{3(n-1)^2}{(n-2)(n-3)} \quad \text{Formula 1}$$

Negative kurtosis values indicate that the distribution of intensity data in terms of each angular position is flatter than the normal distribution; i.e., the data values spread from around the mean value and the tail of the distribution is wider. The smaller the kurtosis value, the flatter the distribution. In this embodiment, the kurtosis is set to −0.4 or less; thus, the difference in the reflection intensity between the reception angular positions is made small within the angle range α of +15 degrees with respect to the specular reflection direction of a radio wave.

The radio wave reflector 11 has a total light transmittance of 65% or more, preferably 80% or more, more preferably 85% or more, and even more preferably 90% or more, as measured using a standard illuminant D65. The total light transmittance is a ratio of the total transmitted luminous flux to the parallel incident luminous flux of a test piece and is prescribed in JISK7375:2008. Specifically, the radio wave reflector 11 is so-called "transparent." The term "transparent" means that one side of the radio wave reflector 11 can be seen from the other side, and includes translucence. Further, the radio wave reflector 11 may be colored as a whole. In addition, as described in detail later, when the radio wave reflector 11 comprises a conductive thin film layer 16 comprising an electric conductor 12, a substrate layer 13, an adhesive layer 14, and a protective layer 15, each layer may be formed from a resin having a total light transmittance of 65% or more, and the electric conductor 12 of the conductive thin film layer 16 may be formed to have a thickness such that the total light transmittance is 65% or more.

In this embodiment, the overall shape of the radio wave reflector 11 is a square in plan view, and the one-side length is preferably 15 cm or more and 400 cm or less. Since radio waves having a frequency of 2 GHz or more and 300 GHz or less are attenuated by distance, the one-side length L10 is preferably set to 15 cm or more in order to achieve reflection with sufficient intensity at all points within the practical distance from the radio wave source 20. The upper limit of the one-side length L10 is not particularly limited; from a manufacturing standpoint, the upper limit is preferably 400 cm or less. The overall shape is not limited to a square and may be a rectangle or a polygon, such as a triangle, pentagon, or hexagon. In this case, the length of the shortest side is set to 15 cm or more and 400 cm or less. Alternatively, the shortest distance between one vertex and the opposite side or between one side and the opposite side may be set to 15 cm or more and 400 cm or less. If the overall shape of the radio wave reflector 11 is circular, the diameter is set to 15 cm or more and 400 cm or less. If the overall shape of the radio wave reflector 11 is elliptical, the short diameter is set to 15 cm or more and 400 cm or less. If the overall shape of the radio wave reflector 11 is sector, the length of the arc or radius, whichever is shorter, is set to 15 cm or more and 400 cm or less. The overall shape may also be cylindrical, conical, or other three-dimensional shapes. The radio wave reflector 11 has an overall shape and size that enable reflection of radio waves with a reflection intensity of −30 dB or more relative to the incident wave, and the shape and size are appropriately selected according to embodiments in which the radio wave reflector 11 is used.

In this embodiment, the radio wave reflector 11 has a thickness L1 of about 0.25 mm. The thickness L1 is not limited to this value and is preferably 1 mm or less. When the radio wave reflector 11 comprises the conductive thin film layer 16, the substrate layer 13, the adhesive layer 14, and the protective layer 15, the thickness of each of the substrate layer 13, the conductive thin film layer 16, the adhesive layer 14, and the protective layer 15 is set such that the thickness L1 of the radio wave reflector 11 is 1 mm or less. Since the thickness L1 of the radio wave reflector 11 is small, the radio wave reflector 11 has flexibility. Flexibility refers to the property of being flexible under ordinary temperature and ordinary pressure, and capable of undergoing deformation, such as bending, without shearing or rupture even when force is applied. The radio wave reflector 11 has flexibility to the extent that it can be bonded along a curved surface with a curvature radius R of about 300 mm; however, the value of the curvature radius R is not limited. The thickness L1 of the radio wave reflector 11 is the sum of the thickness L3 of the conductive thin film layer 16 and the thickness L2 of the substrate layer 13, or the sum of the thickness L3 of the conductive thin film layer 16, the thickness L2 of the substrate layer 13, the thickness L4 of the adhesive layer 14, and the thickness L5 of the protective layer 15. However, since the thickness L3 of the conductive thin film layer 16 is very thin compared to each of the thicknesses L2, L4, and L5 of the substrate layer 13, the adhesive layer 14, and the protective layer 15, the thickness L3 of the conductive thin film layer 16 may be ignored when calculating the thickness L1 of the radio wave reflector 11. The thickness L1 of the radio wave reflector 11, the thickness L3 of the conductive thin film layer 16, the thickness L2 of the substrate layer 13, the thickness L4 of the adhesive layer 14, and the thickness L5 of the protective layer 15 are each determined by measuring any multiple points and calculating the average value of the obtained measurement values. The thickness L1, thickness L3, thickness L2, thickness L4, and thickness L5 may be measured, for example, by a reflectance spectroscopic film thickness analyzer (e.g., F3-CS-NIR produced by Filmetrics Japan, Inc.) as a measuring instrument.

The surface resistivity of the radio wave reflector 11 is preferably 0.003Ω/□ or more and 10Ω/□ or less when the radio wave reflector 11 is attached to a wall etc. and is in a flat state. As described in detail later, the surface resistivity is measured as the surface resistivity of the conductive thin film layer 16 comprising the electric conductor 12. The surface resistivity of the radio wave reflector 11 in a flat state is the surface resistivity of the radio wave reflector 11 when the radio wave reflector 11 is placed on a flat placement surface. The term "flat" means a state in which there is no unevenness and no curves, or a state in which the curvature radius at any point on the surface is 1000 mm or more even if there is unevenness.

The surface resistivity means surface resistance per $cm^2$ (one square centimeter). The surface resistivity can be measured in accordance with the four-terminal method specified in JISK6911 by bringing measurement terminals into contact with the surface of the conductive thin film layer 16 described later. If the conductive thin film layer 16 is protected with a resin sheet etc. and is not exposed, the measurement may be performed by an eddy current method using a non-contact resistance measurement instrument (product name: EC-80P or an equivalent thereof, produced by Napson Corporation).

In the radio wave reflector 11, the change rate R in surface resistivity before and after the radio wave reflector 11 is curved along the surface of a member having a curved surface with a curvature radius of 200 mm (also referred to as "the change rate R in surface resistivity when curved") may be −10% or more and 10% or less. The change rate R in surface resistivity when curved is the percentage of change of surface resistivity R2 of the radio wave reflector 11 curved along the surface of a member having a curved surface with a curvature radius of 200 mm with respect to surface resistivity R1 of the radio wave reflector 11 in a flat state. The change rate R in surface resistivity when curved is determined by the following formula.

$$R(\%) = (R2 - R1)/R1 \times 100$$

The reflection intensity of radio waves changes depending on surface resistivity. However, since the change rate R in surface resistivity when the radio wave reflector 11 is curved is −10% or more and 10% or less, sufficient reflection intensity of radio waves can be achieved even when the radio wave reflector 11 is curved, as in when it is in a flat state.

The radio wave reflector 11 preferably has a flexural modulus of 0.05 GPa or more and 4 GPa or less. Flexural modulus is a value that indicates how much flexural stress can be withstood and is defined in JIS K7171. When the radio wave reflector 11 has a flexural modulus within the above range, the radio wave reflector 11 has flexibility and can be attached to a curved surface with a curvature radius of 200 mm or more by curving the radio wave reflector 11 without breaking the radio wave reflector 11. The flexural modulus is measured in accordance with JIS K7171. Flexibility refers to the property of being flexible under ordinary temperature and ordinary pressure, and capable of undergoing deformation, such as bending, without shearing or rupture even when force is applied.

The radio wave reflector 11 preferably has a Young's modulus of 0.01 GPa or more and 80 GPa or less. Young's modulus is the elastic modulus of a solid when stretched by applying tension thereto in one direction, is also called "tensile elastic modulus," and is defined in JIS K7161-2014. When the radio wave reflector 11 has a Young's modulus within the above range, the radio wave reflector 11 can be easily deformed and can be attached to a curved surface with a curvature radius of 200 mm or more by curving the radio wave reflector 11 without breaking the radio wave reflector 11. The Young's modulus is measured in accordance with JIS K7127-1999.

The radio wave reflector 11 has at least flexibility to the extent that it can be attached along a curved surface with a curvature radius of 200 mm or more. It is preferred that the radio wave reflector 11 has flexibility to the extent that it can be attached along a curved surface with a curvature radius of 100 mm or more.

The radio wave reflector 11 may have plasticity. Plasticity refers to the property of being deformable by applying external pressure, and retaining the deformed shape even after the force is removed when deformation beyond the elastic limit is imparted by applying pressure. All of the synthetic resins forming the substrate layer 13, the adhesive layer 14, and the protective layer 15 may have plasticity, or at least one of the substrate layer 13, the adhesive layer 14, and the protective layer 15 may have plasticity.

In the radio wave reflector 11, the change of yellowness index, which is the difference between the yellow index after a heat and humidity resistance test and the yellow index before the heat and humidity resistance test, is 3 or less. Yellow index, also called the "yellowness index," refers to the degree to which the hue is away from colorless or white to the yellow direction. The yellow index is determined by a method in accordance with JISK7373.

The heat and humidity resistance test is a test in which the radio wave reflector 11 is allowed to stand in a constant temperature and humidity chamber adjusted to a temperature of 60° C. and a humidity of 95% RH (relative humidity: 95%) for 500 hours, then removed from the constant temperature and humidity chamber, and allowed to stand at ordinary temperature for 4 hours, and the properties and condition of the radio wave reflector 11 is checked.

Before and after the heat and humidity resistance test, the radio wave reflector 11 is caused to specularly reflect an incident wave having a frequency of 2 GHz or more and 300 GHz or less at a predetermined incident angle of the incident wave in the range of 15 degrees or more and 75 degrees or less, preferably at 45 degrees, more preferably at all of the angles in the range of 15 degrees or more and 75 degrees or less. In this case, the difference between the intensity of the reflective wave of the radio wave reflector 11 after the heat and humidity resistance test and the intensity of the reflective wave of the radio wave reflector 11 before the heat and humidity resistance test is within 3 dB at least at one frequency of incident wave. Preferably, in the entire frequency band of 2 GHz or more and 300 GHz or less, the difference in the intensity of the reflective wave of the radio wave reflector 11 before and after the heat and humidity resistance test is within 3 dB.

In the radio wave reflector 11, the change rate r in surface resistivity before and after the heat and humidity resistance test (also referred to as "the change rate r in surface resistivity during the heat and humidity resistance test") is 20% or less. The change rate r in surface resistivity during the heat and humidity resistance test is the percentage of change of surface resistivity r2 after the heat and humidity resistance test with respect to surface resistivity r1 before the heat and humidity resistance test. The change rate r in surface resistivity during the heat and humidity resistance test is determined by the following formula.

$$r = (r1 - r2)/r1 \times 100$$

The reflection intensity of radio waves changes depending on surface resistivity. However, since the change rate r in surface resistivity of the radio wave reflector 11 during the heat and humidity resistance test is 20% or less, the radio wave reflector 11 achieves sufficient reflection intensity of radio waves without significantly decreasing reflection intensity even after the heat and humidity resistance test.

When a pencil hardness test is performed on the radio wave reflector 11, the pencil hardness at a surface load of 500 g on the protective layer 15 is preferably "F" or higher, more preferably "H" or higher, and even more preferably "4H" or higher. "Pencil hardness test" as used herein is a test in accordance with JIS K 5600 May 4 (1999). If the load applied to the surface during the pencil hardness test is 500 g±10 g, the load is included in the "surface load of 500 g." When a pencil hardness test is performed on the protective layer 15, the pencil hardness at a surface load of 500 g on the protective layer 15 may be F or higher.

In addition, in the radio wave reflector 11, the reduction rate of the adhesive strength of the protective layer 15 to the layer to be adhered after the heat and humidity resistance test is preferably 50% or less, more preferably 45% or less, and even more preferably 40% or less. The term "the layer to be adhered" as used herein means a layer in direct contact with the target layer. The layer to be adhered of the protective layer 15 is the adhesive layer 14 in this embodiment. The adhesive strength is measured by a tensile adhesive strength test in accordance with JIS K 6849 (1994).

Configuration of Radio Wave Reflector 11

Figure 2:
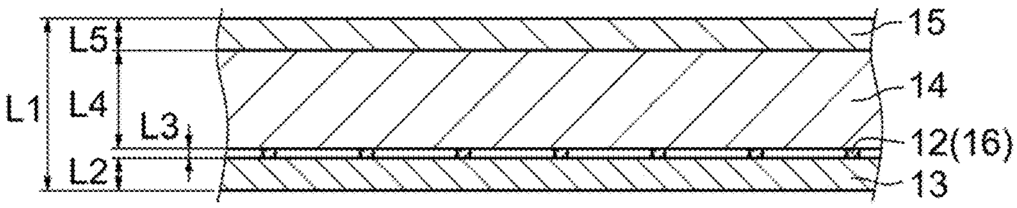
FIG. 2 is a cross-sectional view showing the schematic configuration of a radio wave reflector according to one embodiment of the present invention, and is a cross-sectional view along the B-B line in FIG. 3(B).

An example of the configuration of the radio wave reflector 11 is explained with reference to FIGS. 2 and 3. The radio wave reflector 11 may comprise a conductive thin film layer 16 comprising an electric conductor 12, a substrate layer 13 comprising a substrate and laminated to the conductive thin film layer 16, a protective layer 15 comprising a protective material for protecting the conductive thin film layer 16, and an adhesive layer 14 comprising an adhesive for bonding the conductive thin film layer 16 and the protective layer 15. The radio wave reflector 11 may comprise the conductive thin film layer 16, which comprises the electric conductor 12, and a resin for holding the electric conductor 12 in a sheet shape. At least one of the substrate layer 13, which comprises the substrate, the protective layer 15, which comprises the protective material for protecting the conductive thin film layer 16, and the adhesive layer 14, which comprises the adhesive for bonding the conductive thin film layer 16 and the protective layer 15, may be formed of resin. In FIG. 2, the substrate layer 13, the conductive thin film layer 16, the adhesive layer 14, and the protective layer 15 are laminated in this order from the bottom in the radio wave reflector 11.

In the following explanations, the up-down direction is defined based on FIG. 2, and the vertical-horizontal direction and the right-left direction are defined based on FIGS. 3 and 4; however, the up-down direction, vertical-horizontal direction, and right-left direction are used for illustrative purposes and do not define the up-down direction and vertical-horizontal direction at the time of use, such as installation of the radio wave reflector 11 in a building. Further, FIGS. 1 to 11 are not drawn to actual scale. Additionally, in FIG. 3, the adhesive layer 14 and the protective layer 15 are omitted in part of the radio wave reflector 11.

Substrate Layer 13

The substrate layer 13 is a layer on whose upper surface the conductive thin film layer 16, which comprises the electric conductor 12, is laminated, and comprises a substrate. In this embodiment, the outer shape of the substrate layer 13 is a square in plan view. The shape is not limited to this and may be rectangular, circular, oval, sector, polygonal, three-dimensional, etc. according to the overall shape of the radio wave reflector 11. The substrate of the substrate layer 13 may be a sheet of a synthetic resin. Examples of synthetic resins include one or more members selected from the group consisting of PET (polyethylene terephthalate), polyethylene, polypropylene, polyvinyl chloride, polystyrene, polymethyl methacrylate, polyester, polyformaldehyde, polyamide, polyphenylene ether, vinylidene chloride, polyvinyl acetate, polyvinyl acetal, AS resin, ABS resin, acrylic resin, fluororesin, nylon resin, polyacetal resin, polycarbonate resin, polyamide resin, and polyurethane resin. Although the thickness L2 of the substrate layer 13 (the length in the up-down direction in FIG. 2) is set to 50 μm in this embodiment, the thickness is not limited to this value. In addition to the substrate, the substrate layer 13 may comprise any substance such as a synthetic resin, and any component.

Conductive Thin Film Layer 16

In the conductive thin film layer 16, it is preferable that one or a plurality of linear electric conductors 12 are formed as a thin film on the upper surface of the substrate layer 13. The electric conductor 12 is preferably composed of, for example, silver (Ag). The electric conductor 12 may be composed of any metal that has free electrons. Examples include not only silver, but also gold (Au), copper (Cu), platinum (Pt), zinc (Zn), iron (Fe), tin (Sn), lead (Pb), aluminum (Al), cobalt (Co), indium (In), nickel (Ni), chromium (Cr), titanium (Ti), antimony (Sb), bismuth (Bi), thallium (Tl), germanium (Ge), cadmium (Cd), silicon (Si), tungsten (W), molybdenum (Mo), indium tin oxide (ITO), and alloys (e.g., alloys containing nickel, chromium, and molybdenum). Examples of alloys containing nickel, chromium, and molybdenum include various grades of alloys, such as Hastelloy B-2, B-3, C-4, C-2000, C-22, C-276, G-30, N, W, and X.

In this embodiment, the thickness (film thickness) L3 of the conductive thin film layer 16 (electric conductor 12) is 500 nm (0.5 μm) or less. However, the thickness is not limited to this value. The thickness L3 is preferably 5 nm or more from the viewpoint of ensuring appropriate radio wave intensity. In addition to the electric conductor 12, the conductive thin film layer 16 may comprise any substance such as a synthetic resin, and any component.

The surface roughness Sa of the conductive thin film layer 16 is not particularly limited, and is preferably 1 μm or more and 7 μm or less, and more preferably 1.03 μm or more and 6.72 μm or less. A surface roughness Sa within these ranges facilitates diffuse reflection of radio waves.

The surface roughness Sa is determined by the arithmetical mean height according to ISO 25178 and measured in accordance with ISO 25178. By using a laser microscope (product name: VK-X1000/1050, produced by Keyence Corporation, or an equivalent thereof), the surface roughness Sa of the conductive thin film layer 16 can be determined by measuring the surface roughness at multiple points on the surface of the conductive thin film layer 16 and calculating the average value of the obtained measurement values. The electric conductor 12 and the substrate layer 13 may be used as a measurement target. In this embodiment, the conductive thin film layer 16 comprises a plurality of electric conductors 12, the surface roughness is measured at multiple points on each electric conductor 12, and the average value of the measurement values is defined as the surface roughness Sa of the electric conductors 12.

The conductive thin film layer 16 preferably has a surface resistivity of 3.5Ω/□ or less. The surface resistivity of the conductive thin film layer 16 is the surface resistivity of the radio wave reflector 11.

In an example, in the conductive thin film layer 16, one or a plurality of linear electric conductors 12 are arranged to surround regions 12*a* without the electric conductor 12. That is, the electric conductors 12 and the regions 12*a* without the electric conductor 12 are periodically arranged at predetermined intervals. The electric conductors 12 and the regions 12*a* without the electric conductor 12 together form a thin film. The interval between the adjacent regions 12*a* without the electric conductor 12 may be a length equal to or greater than the line width L6 of the electric conductor 12. Linear means that the length in the longitudinal direction is at least 3000 times longer than the length in the direction perpendicular to the longitudinal direction. In the arrangement pattern of the electric conductor 12 in this embodiment, the electric conductors 12 are arranged at equal intervals along the vertical direction and the horizontal direction, and the region 12*a* without the electric conductor 12 surrounded by the electric conductors 12 is a square, as shown in, for example, FIG. 3(B). That is, the regions 12*a* without the electric conductor 12 are arranged at an interval that is equal to the line width L6 of the electric conductor 12. At the intersections at which the electric conductor 12 (12A) along the horizontal direction and the electric conductor 12 (12B) along the vertical direction overlap, the electric conductors 12A and 12B are electrically conducting. The line width L6 of the electric conductor 12 is set to 0.1 μm or more and 4.0 μm or less. The length L7 between the adjacent electric conductors 12 along the vertical direction or the horizontal direction (the one-side length of the square region 12*a* without the electric conductor 12) is set to be larger than the wavelengths of visible light and smaller than the wavelengths of the radio waves reflected from the radio wave reflector 11. In this embodiment, the length L7 is set to 2 μm or more and 10 cm or less. The length L7 is more preferably 20 μm or more and 1 cm or less, even more preferably 25 μm or more and 1 mm or less, and still even more preferably 30 μm or more and 250 μm or less.

The arrangement pattern of the electric conductor 12 is not limited to the arrangement shown in FIG. 3(B). For example, the interval between the adjacent electric conductors 12A extending in the horizontal direction may be different from the interval between the adjacent electric conductors 12B extending in the vertical direction, and the shape of the region 12*a* without the electric conductor 12 may be rectangular. It is also possible to arrange the electric conductors 12 according to the arrangement patterns shown in FIGS. 4(A) to 4(E). In FIG. 4(A), a plurality of the electric conductors 12A are arranged at predetermined intervals along the horizontal direction, and a plurality of electric conductors 12B extending in the vertical direction are arranged in a staggered manner between the electric conductors 12A extending in the horizontal direction. Staggered means a state in which a plurality of the electric conductors 12B extending in the vertical direction are arranged at predetermined intervals in the horizontal direction, and a plurality of the electric conductors 12B forming a single row are positioned between a plurality of the electric conductors 12B forming rows that are adjacent in the vertical direction to the row, whereby the electric conductors 12B forming rows alternately are arranged in a straight line. In FIG. 4(B), the electric conductors 12A are arranged along the horizontal direction, the electric conductors 12B and 12C extend along oblique directions symmetrically inclined with respect to the horizontal direction, and the electric conductors 12B and 12C intersect with each other on the electric conductors 12A. Accordingly, the shape of the region 12*a* without the electric conductor 12 is an equilateral triangle. Instead of an equilateral triangle, the shape of the region 12*a* without the electric conductor 12 may be an isosceles triangle or a triangle having three sides of different lengths. In FIG. 4(C), the regions 12*a* without the electric conductor 12 formed by the linear electric conductors 12 and having a regular hexagonal shape are periodically arranged. In FIG. 4(D), the regions 12*a* without the electric conductor 12 formed by the linear electric conductors 12 and having a regular pentagonal shape are periodically arranged. In FIG. 4(E), the regions 12*a* without the electric conductor 12 formed by the linear electric conductors 12 and having a circular shape are periodically arranged. FIGS. 4(A) to 4(E) show only the electric conductors 12.

The conductive thin film layer 16 preferably has an electric conductor coverage of 1% or more and 10% or less. Electric conductor coverage refers to the percentage of the area occupied by the electric conductor 12 per unit area in plan view. The coverage can also refer to the percentage of the area of the substrate layer 13 covered by the electric conductor 12 with respect to the area of substrate layer 13 in plan view. When the conductive thin film layer 16 is not provided on the periphery of the substrate layer 13 but is provided inside the edge of the substrate layer 13, as in the embodiments shown in FIGS. 2 and 3, the coverage refers to the percentage of the area occupied by the electric conductor 12 per unit area in the region in which the conductive thin film layer 16 is provided on the upper surface of the substrate layer 13 in plan view. The region in which the conductive thin film layer 16 is provided is the upper surface region of the substrate layer 13 excluding the periphery of the substrate layer 13 (the portion between the edge of the substrate layer 13 and the conductive thin film layer 16). The electric conductor coverage is measured using, for example, a scanning electron microscope (SEM), transmission electron microscope (TEM), or optical microscope.

Examples of the method for producing the conductive thin film layer 16 having the arrangement pattern described above include a method comprising forming a conductive film, forming a pattern by etching, and taking out a conductive thin film body having the pattern; and a method comprising applying a photosensitive resist to a base film having a lift-off layer, forming a pattern by a photolithography method, filling the pattern portion with an electric conductor, and then taking out a conductive thin film body having the pattern. The method for producing the conductive thin film layer 16 is not limited to the above methods, and examples of methods that can be used for forming the conductive thin film layer 16 include a method of bonding a metal thin film and a method of depositing a metal.

Another Embodiment of Conductive Thin Film Layer 16

Figure 5:
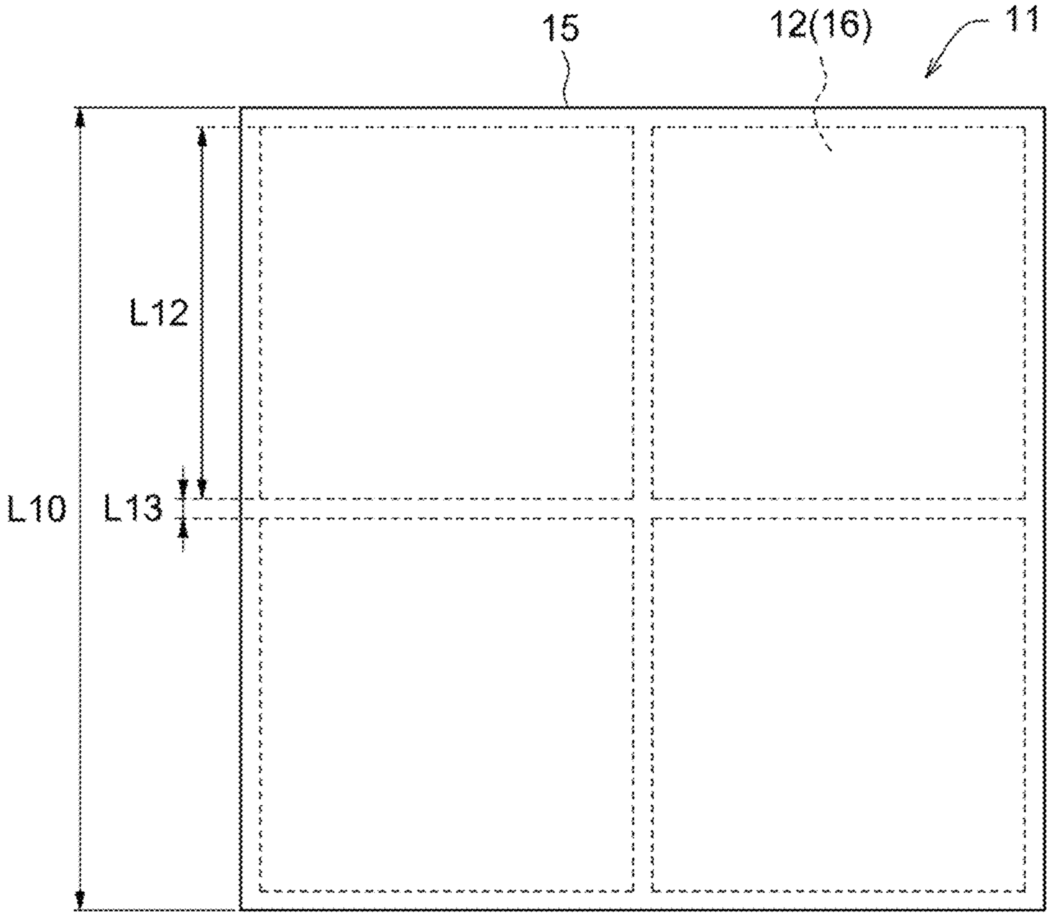
FIG. 5 is a plan view of a radio wave reflector showing another example of an arrangement pattern of an electric conductor.

The conductive thin film layer 16 may have, for example, a metamaterial structure. In the metamaterial structure, the electric conductors 12 in a sheet shape as dielectrics are arranged periodically at equal intervals. Due to this periodic arrangement structure, the metamaterial structure has a negative permittivity, and reflect radio waves in a specific frequency band that is determined based on the periodic interval. The shape of each electric conductor 12 is not limited and may be the shape described above. For example, as shown in FIG. 5, each electric conductor 12 may have a square shape. In the electric conductor 12, the one-side length L12 and the interval L13 between the adjacent electric conductors 12 may be set so as to reflect radio waves with a frequency of 2 GHz or more and 300 GHz or less. In this case, the one-side length L12 of the electric conductor 12 may be 0.7 mm or more and 800 mm or less, and the interval L13 may be 1 μm or more and 1000 μm or less. The thickness L3 of the electric conductor 12 is preferably 350 nm (0.35 μm) or less, more preferably 100 nm or less, and even more preferably 50 nm or less. The number of the electric conductors 12 is appropriately set according to the size (area) of the substrate layer 13. In an example, four electric conductors 12 in total may be formed on the substrate layer 13, i.e., two vertically and two horizontally, according to the size of the substrate layer 13. In this case, the one-side length L12 of each electric conductor 12 is set to 77.460 mm, the interval L13 between the adjacent electric conductors 12 is set to 100 μm, and the thickness L3 is set to 350 nm (0.35 μm) or less. The conductive thin film layer 16 is not limited to one having a metamaterial structure, and may be any of a metallic nanowire lamination film, multi-layer graphene, or partially exfoliated graphite.

Another Embodiment of Conductive Thin Film Layer 16

Figure 6:
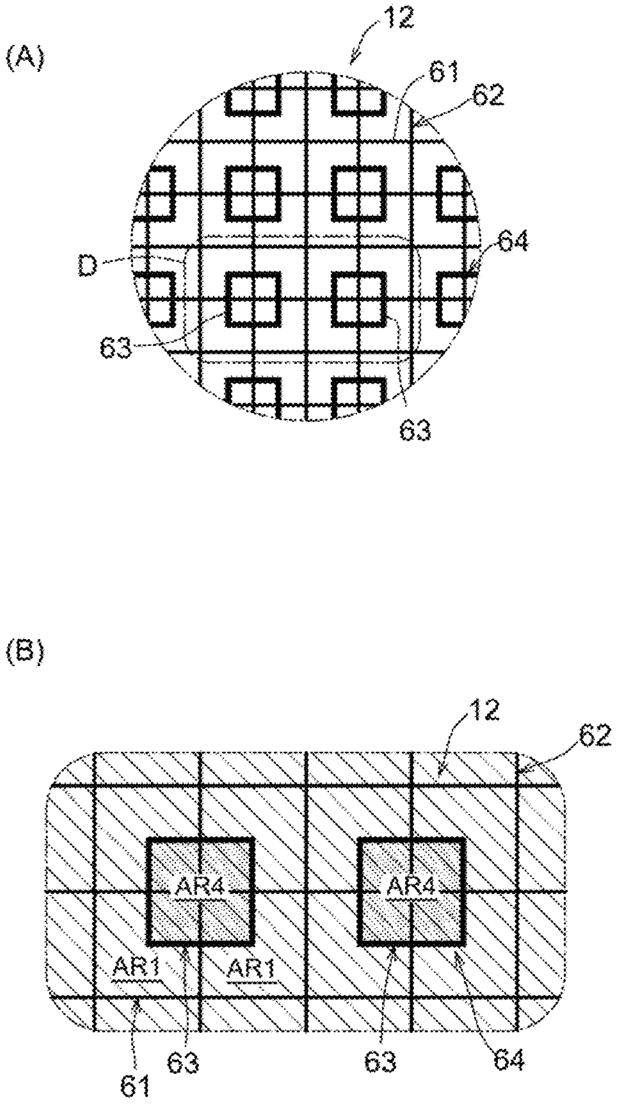
FIG. 6(A) is a cross-sectional view showing another example of an electric conductor.
FIG. 6(B) is an enlarged view of the portion D in FIG. 6(A).

The electric conductor 12 forming the conductive thin film layer 16 may be, for example, as shown in FIG. 6. In the electric conductor 12, first electrically conductive portions 62 each including a plurality of first enclosures 61 and second electrically conductive portions 64 each including a plurality of second enclosures 63 are formed in a pattern in which they overlap. The first enclosures 61 and the second enclosures 63 do not share any portions with each other when projected onto a projection plane parallel to the conductive thin film layer.

In the first electrically conductive portions 62, first enclosures 61 surrounding a first region AR1 in which the electric conductor 12 is not formed are repeatedly formed at fixed intervals. In this example, the first electrically conductive portions 62 are formed in a grid pattern, but may also be formed in, for example, a pentagonal shape, a hexagonal shape, or a circular shape.

The second electrically conductive portions 64 surround fourth regions AR4 in which the electric conductor 12 is not formed. Each fourth region AR4 is formed so as to extend over a plurality of adjacent first regions AR1. The second electrically conductive portions 64 may be located on the same plane as the first electrically conductive portions 62 or may be located on a plane different from the first electrically conductive portions 62. That is, the second electrically conductive portions 64 may or may not be electrically connected to the first electrically conductive portions 62. The adjacent second electrically conductive portions 64 are spaced apart from each other, but may be in contact with each other. The second electrically conductive portions 64 are formed in a quadrilateral shape, but may also be formed in, for example, a pentagonal shape, a hexagonal shape, or a circular shape.

The electric conductor 12 can improve diffusion of radio waves. The term "diffusion of radio waves" used herein means that the difference between the specular reflection intensity and the radio wave intensity around the specular reflection falls within a certain range.

Adhesive Layer 14

The adhesive layer 14 is configured to adhere the protective layer 15 on the substrate layer 13 and the conductive thin film layer 16 and is composed of an adhesive. The adhesive layer 14 has a size corresponding to the substrate layer 13 in plan view. The adhesive of the adhesive layer 14 for use may be a synthetic resin or a rubber adhesive sheet. Examples of synthetic resins include an acrylic resin, a silicone resin, and a polyvinyl alcohol resin. The thickness L4 of the adhesive layer 14 is set to 150 μm in this embodiment, but is not limited to this value. In addition to the adhesive, the adhesive layer 14 may comprise any substance such as a synthetic resin, and any component.

The adhesive layer 14 preferably comprises a synthetic resin material having a dielectric loss tangent (tan δ) of 0.018 or less. The lower the dielectric loss tangent, the more preferable it is. The dielectric loss tangent is typically 0.0001 or more. The dielectric loss tangent represents the degree of electrical energy loss in a dielectric. The electrical energy loss is greater in a material having a greater dielectric loss tangent. The use of the adhesive layer 14 having a dielectric loss tangent of 0.018 or less can reduce the loss of electrical energy of radio waves in the radio wave reflector 11, and can further increase the reflection intensity.

The synthetic resin material of the adhesive layer 14 preferably has a relative permittivity that varies according to the frequency of an electric field. The relative permittivity is a ratio of the permittivity of a medium (the synthetic resin material in this embodiment) to the permittivity of vacuum. Since the relative permittivity varies according to an electric field, the intensity of the reflective wave can be increased in an electric field at a specific frequency. The relative permittivity preferably varies between 1.5 or more and 7 or less, and more preferably between 1.8 or more and 6.5 or less. The dielectric loss tangent and the relative permittivity are measured by a known method (e.g., a cavity resonator method or a coaxial resonator method) using a measuring instrument (e.g., TOYO Corporation, model number: TTPX table-top cryogenic probe station or an MIA-5M material/impedance analyzer).

Not only the synthetic resin material constituting the adhesive layer 14, but also the synthetic resin material constituting the substrate layer 13 and the protective layer 15, may have a dielectric loss tangent of 0.018 or less, and may have a relative permittivity that varies according to an electric field.

The adhesive layer 14 preferably has a hydroxyl value of 5 mg KOH/g or more, more preferably 8 mg KOH/g or more, even more preferably 30 mg KOH/g or more, and still even more preferably 90 mg KOH/g or more. The upper limit of the hydroxyl value of the adhesive layer 14 is preferably 120 mg KOH/g or less. When the hydroxyl value of the adhesive layer 14 is 5 mg KOH/g or more, there is an advantage such that the adhesive layer 14 is less likely to foam and/or whiten in a high temperature and high humidity environment. In the present specification, the hydroxyl value is measured by a test method in accordance with JIS K 1557.

The adhesive layer 14 preferably has an acid value of 50 mg KOH/g or less, more preferably 45 mg KOH/g or less, even more preferably 30 mg KOH/g or less, and still even more preferably 10 mg KOH/g or less. The lower limit of the acid value of the adhesive layer 14 is preferably 0.1 mg KOH/g or more. When the acid value of the adhesive layer 14 is 50 mg KOH/g or less, the electric conductor 12 can be prevented from corroding, and the stability of radio wave reflectivity over time can be increased. In the present specification, the acid value is measured by a test method in accordance with JIS K 2501.

The adhesive layer 14 is preferably free of an ultraviolet absorber. When the adhesive layer 14 is free of an ultraviolet absorber, there is an advantage such that the adhesive layer 14 can be easily adjusted to be colorless and transparent. The phrase "free of" as used herein includes not only the case in which the adhesive layer 14 contains no ultraviolet absorber at all, but also the case in which the adhesive layer 14 contains an ultraviolet absorber in a small amount that does not impair the colorlessness and transparency.

Protective Layer 15

The protective layer 15 has a size corresponding to the substrate layer 13 in plan view, protects the electric conductor 12, and is composed of a protective material. The protective material of the protective layer 15 for use may be a film of a synthetic resin. Examples of synthetic resins include one or more members selected from the group consisting of PET (polyethylene terephthalate), COP (cycloolefin polymer), polyethylene, polypropylene, polyvinyl chloride, polystyrene, polymethyl methacrylate, polyester, polyformaldehyde, polyamide, polyphenylene ether, vinylidene chloride, polyvinyl acetate, polyvinyl acetal, AS resin, ABS resin, acrylic resin, fluororesin, nylon resin, polyacetal resin, polycarbonate resin, polyamide resin, and polyurethane resin. The thickness L5 of the protective layer 15 is set to 50 μm in this embodiment, but is not limited to this value. In addition to the protective material, the protective layer 15 may comprise any substance such as a synthetic resin, and any component.

In the protective layer 15, for example, at least one of the upper surface (outer surface) and lower surface (surface in contact with the adhesive layer 14) of the film of a synthetic resin in FIG. 2 may be subjected to anti-glare treatment or anti-reflection treatment.

Anti-glare treatment (also referred to as "AG treatment" or "non-glare treatment") refers to a treatment in which an uneven shape is formed on at least one surface of the protective layer 15 to scatter light, thereby suppressing glare from a light source, such as lighting, on the protective layer 15. Examples of the method for performing anti-glare treatment include a method comprising applying a binder resin in which fine particles are dispersed to the surface of a film. Known methods, such as sandblasting and chemical etching, may also be used.

Anti-reflection treatment (also referred to as "AR treatment") refers to a treatment in which an antireflection coating is formed on at least one surface of a film, and light reflected from the surface of the antireflection coating and light reflected from the interface between the antireflection coating and the film are attenuated by interference to suppress glare from a light source, such as lighting. The antireflection coating may be a single layer or may be composed of thin films having different refractive indices alternately laminated, and a known antireflection coating is used.

The protective layer 15 may be a layer in which a film subjected to anti-glare treatment or anti-reflection treatment is attached to one or both surfaces of a film of a synthetic resin.

The protective layer 15 preferably has a water vapor transmission rate of 20 $g/m^2 \cdot 24$ h or less, more preferably 16 $g/m^2 \cdot 24$ h or less, even more preferably 12 $g/m^2 \cdot 24$ h or less, and still even more preferably 10 $g/m^2 \cdot 24$ h or less, at a temperature of 40° C. and a humidity of 90% RH (relative humidity). When the protective layer 15 has a water vapor transmission rate of 20 $g/m^2 \cdot 24$ h or less at a temperature of 40° C. and a humidity of 90% RH (relative humidity), there are advantages such that the conductive thin film layer 16 is less likely to corrode and that the surface resistivity of the conductive thin film layer 16 is less likely to increase. In the present specification, the water vapor transmission rate is measured by a test method in accordance with JIS Z 0208 (1976).

According to this embodiment, the radio wave reflector 11 has a total light transmittance of 65% or more as measured using a standard illuminant D65 and is highly transparent. Thus, when the radio wave reflector 11 is used in a living room, it does not block the line of sight, and does not obstruct the atmosphere or scenery of the living room since the existence of the radio wave reflector 11 is not conspicuous, thus enabling the scenery to be kept in a good condition. In addition, when the radio wave reflector 11 is caused to specularly reflect an incident wave with a frequency of 2 GHz or more and 300 GHz or less, the intensity of the reflective wave is −30 dB or more relative to the incident wave at least at one frequency. This allows radio waves to be reflected while the reflection intensity is kept high. Thus, even with the use of short-wavelength radio waves with high straight-advancing properties, it is possible to reduce the blind-spot space in the interior of a room as much as possible, which eliminates the need for installing a large number of radio wave reflectors to reduce the blind-spot space.

When the kurtosis within the angle range α of +15 degrees with respect to the specular reflection direction of a radio wave is set to −0.4 or less, the difference in the reflection intensity between the reception angular positions is made small within the angle range α of ±15 degrees, and the receiver 21 can receive the radio wave reflected by the radio wave reflector 11 while the reflection intensity is maintained.

Furthermore, when the conductive thin film layer 16, which comprises the electric conductor 12, is laminated to the substrate layer 13, and the protective layer 15 is adhered by means of the adhesive layer 14, the radio wave reflector 11 can be rigid enough to be attached to a wall or a pillar in a living room etc., which facilitates operations such as attachment. In addition, the use of the protective layer 15 can prevent the conductive thin film layer 16 from being damaged.

When the surface resistivity of the conductive thin film layer 16 is 3.5Ω/□ or less, the radio wave reflector 11 can reflect radio waves while the reflection intensity is kept high. Further, when regions without the electric conductor surrounded by one or a plurality of the linear electric conductors 12 are periodically arranged at predetermined intervals in the conductive thin film layer 16, light rays, such as visible light, pass through the regions 12*a* without the electric conductor 12, and the total light transmittance of the radio wave reflector 11 can be 65% or more.

When the electric conductor coverage of the conductive thin film layer 16 is 1% or more and 10% or less, the percentage of the area in which the electric conductor 12 is not disposed is large, and the total light transmittance of the radio wave reflector 11 is 65% or more.

When the line width L6 of the electric conductor 12 is 0.1 μm or more and 4.0 μm or less, the percentage of the area in which the electric conductor 12 is not disposed is large, and the total light transmittance of the radio wave reflector 11 is 65% or more.

When the overall shape of the radio wave reflector 11 is a quadrilateral having a one-side length of 15 cm or more and 400 cm or less, radio waves can be reflected with a practical reflection intensity that can be received by a receiver in a living room space. Further, blind spots are less likely to be caused when the radio wave reflector 11 is placed in a living room.

Subjecting the protective layer 15 to anti-glare treatment or anti-reflection treatment can suppress glare from a light source, such as lighting, on the radio wave reflector 11.

Another Embodiment

Figure 7:
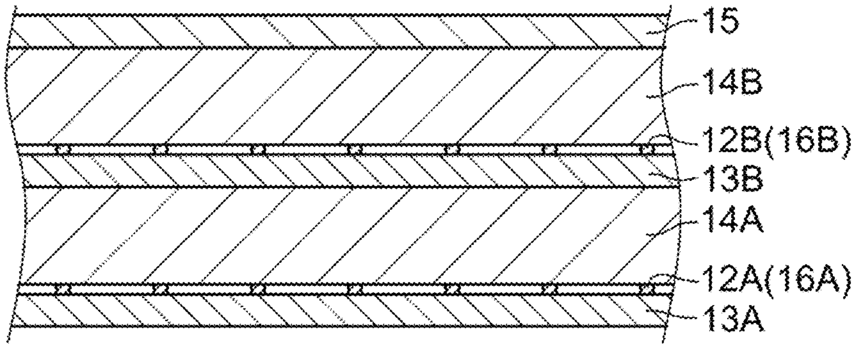
FIG. 7 is a cross-sectional view showing the schematic configuration of a radio wave reflector according to another embodiment.

FIG. 7 shows another embodiment of the present invention. In the radio wave reflector 11 shown in FIG. 7, two layers, i.e., the conductive thin film layers 16A and 16B are laminated in the up-down direction. The arrangement patterns of the conductive thin film layer 16A formed on the substrate layer 13A and the conductive thin film layer 16B formed on the substrate layer 13B are aligned to overlap each other in plan view. Alternatively, the arrangement patterns of the conductive thin film layers 16A and 16B may not overlap each other in plan view, and the conductive thin film layers 16A and 16B may have different arrangement patterns. The lower surface of the substrate layer 13B is bonded to the conductive thin film layer 16A via the adhesive layer 14A, and the protective layer 15 is bonded to the conductive thin film layer 16B via the adhesive layer 14B.

While radio waves incident on the radio wave reflector 11 are reflected from the conductive thin film layer 16B of the first layer, part of the radio waves pass through the conductive thin film layer 16B without being reflected from the conductive thin film layer 16B. The radio waves that passed through the conductive thin film layer 16B are reflected from the conductive thin film layer 16A of the second layer. Accordingly, by laminating a plurality of the conductive thin film layers 16, which comprise the electric conductor 12, in the up-down direction, radio waves that passed through the conductive thin film layer 16B of the upper layer can be reflected from the conductive thin film layer 16A of the lower layer, and the reflection intensity of the radio wave reflector 11 can be kept higher compared with the case where the electric conductor 12 comprises only a single layer. In addition, the kurtosis of distribution of the reflection intensities within the angle range $\alpha$ of ±15 degrees with respect to the specular reflection direction of radio waves can be further reduced, making the difference in the reflection intensity between the angular positions within the angle range $\alpha$ small. Further, the use of the two adhesive layers 14A and 14B can further reduce the value of the dielectric loss tangent as compared with the embodiments shown in FIG. 2, making it possible to keep the reflection intensity higher. Other configurations and functions are the same as those in the embodiment shown in FIGS. 2 and 3, and the same reference numerals are used to refer to corresponding configurations to omit the detailed descriptions thereof.

In the embodiment shown in FIG. 7, two layers of the conductive thin film layers 16 formed on the respective substrate layers 13 are laminated. Alternatively, three layers or more thereof may be laminated. As the number of the layers of the conductive thin film layers 16 increases, the reflection intensity increases; however, since the overall thickness of the radio wave reflector 11 increases, the total light transmittance and the flexibility decrease. For this reason, the number of the layers of the conductive thin film layers 16 is set appropriately according to the intended use etc.

Another Embodiment

Figure 8:
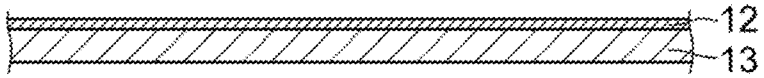
FIG. 8 is a cross-sectional view showing the schematic configuration of a radio wave reflector according to another embodiment.
Figure 9:
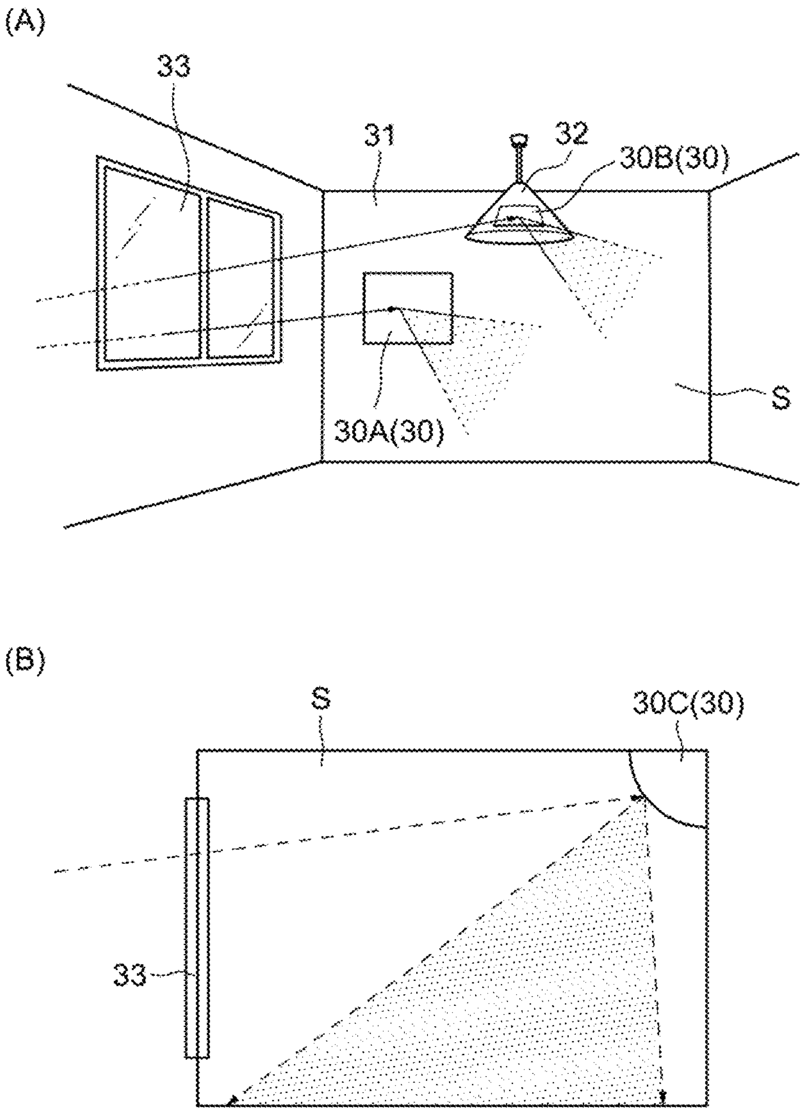
FIG. 9(A) is an explanatory drawing showing an application example of a building material to a building.
FIG. 9(B) is a plan view showing an application example of the building material to the inside of a room.

FIG. 8 shows another embodiment of the radio wave reflector 11. In the embodiment shown in FIG. 8, the radio wave reflector 11 comprises a conductive thin film layer 16 and a substrate layer 13, but does not comprise an adhesive layer 14 and a protective layer 15. In this case, the electric conductor 12 of the conductive thin film layer 16 is formed in a square shape as a thin film having a sheet shape on substantially the entire upper surface of the substrate layer 13. The thickness L3 of the electric conductor 12 is set to 10 nm in this embodiment, but is not limited to this value. The surface resistivity in this embodiment is 9.8Ω/□. In the embodiment shown in FIG. 8, the electric conductor coverage is defined as the percentage of the area occupied by the electric conductor 12 per unit area in the portion at which the conductive thin film layer 16 is provided on the substrate layer 13, and the electric conductor coverage is 100%. In this embodiment, the total light transmittance of the radio wave reflector 11 is 70%. Other configurations and functions are the same as those in the embodiment shown in FIGS. 2 and 3, and the same reference numerals are used to refer to corresponding configurations to omit the detailed descriptions thereof.

In this embodiment, the conductive thin film layer 16 is composed of a single sheet of the electric conductor 12. Alternatively, the conductive thin film layer 16 may be composed of a plurality of sheets of the electric conductor 12. In this case, the plurality of the electric conductors 12 are arranged at predetermined intervals on substantially the entire upper surface of the substrate layer 13. The shape of the electric conductor 12 may be a circle, a rectangle, a triangle, a polygon, or the like. The conductive thin film layer 16 may have a metamaterial structure and may be any of a metallic nanowire lamination film, multilayer graphene, or partially exfoliated graphite.

Use

Any of the radio wave reflectors 11 described above may be included in a building material 30 and used. Examples of the building material 30 include, as shown in FIG. 9(A), materials that can be installed in a building as a decorative material 30A, such as wallpapers for wall surfaces, ceiling surfaces, and floor surfaces of rooms and corridors, wallpapers for partitions, and posters, or as a decorative material 30B, such as transparent stickers for light covers. By attaching decorative materials 30A, 30B including the radio wave reflector 11 to a wall surface 31 and a light cover 32, radio waves entering the room from the outside through a window 33 or the like are reflected by the decorative materials 30A, 30B provided on the wall surface 31 and the light cover 32. As a result, radio waves reach a wider area of the indoor space S, thus increasing the convenience of radio wave reception.

Alternatively, the radio wave reflector 11 may be formed to be present inside a building material 30. For example, the wall surface 31 itself or the light cover 32 itself, which are building materials 30, may comprise a radio wave reflector 11. Further, the building material 30 is not limited to indoor walls and light covers, and may be, for example, partitions, pillars, lintels, outer walls of buildings, windows, and the like. For example, FIG. 9(B) is a plan view of the interior of a room. The building material 30 that is a radio wave reflector 11 is formed as a corner post 30C that has a curved surface at the corner of the room. Radio waves entering from a window 33 are reflected by the corner post 30C and thus reach a wider range of the indoor space S. FIGS. 9(A) and 9(B) show an application example of the building material 30 and are not intended to show the actual range of radio wave reflection. The use of the radio wave reflector 11 is not limited to use in the building material 30, and the radio wave reflector 11 may be present in a member comprising a non-conductive material such as resin and used at any location.

Evaluation Test

Examples 1 to 8 were produced as radio wave reflectors 11. Examples 1 to 8 and Comparative Examples 1 to 3 were tested and evaluated for scenery visibility, radio wave extensibility to blind spots, and anti-glare properties. Table 1 shows the conditions and evaluation results of Examples 1 to 8, and Table 2 shows the conditions and evaluation results of Comparative Examples 1 to 3. However, the radio wave reflector 11 of the present invention is not limited to Examples 1 to 8.

Example 1

Figure 3:
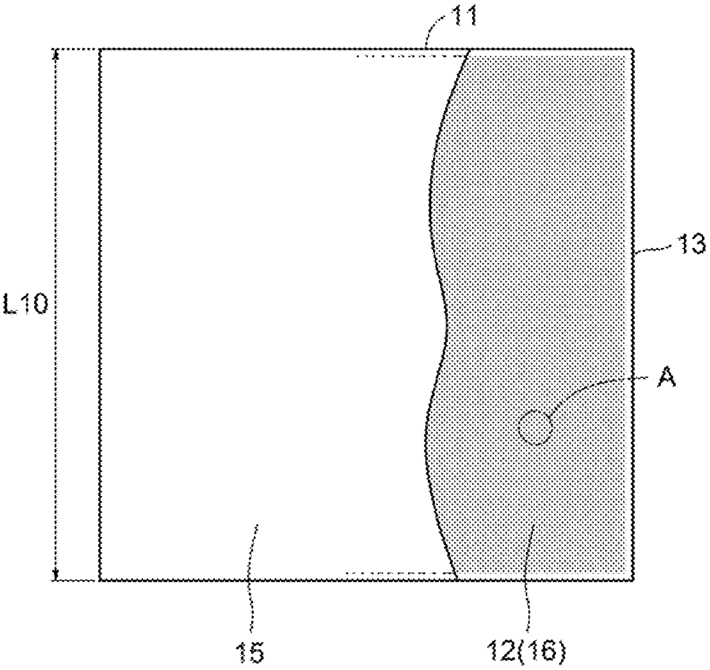
FIG. 3 shows the overall schematic configuration of the radio wave reflector shown in FIG. 2.
Figure 3:
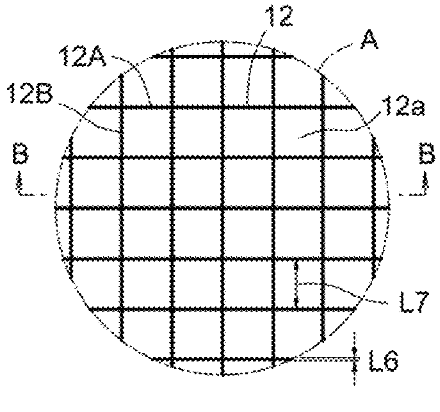
Figure 4:
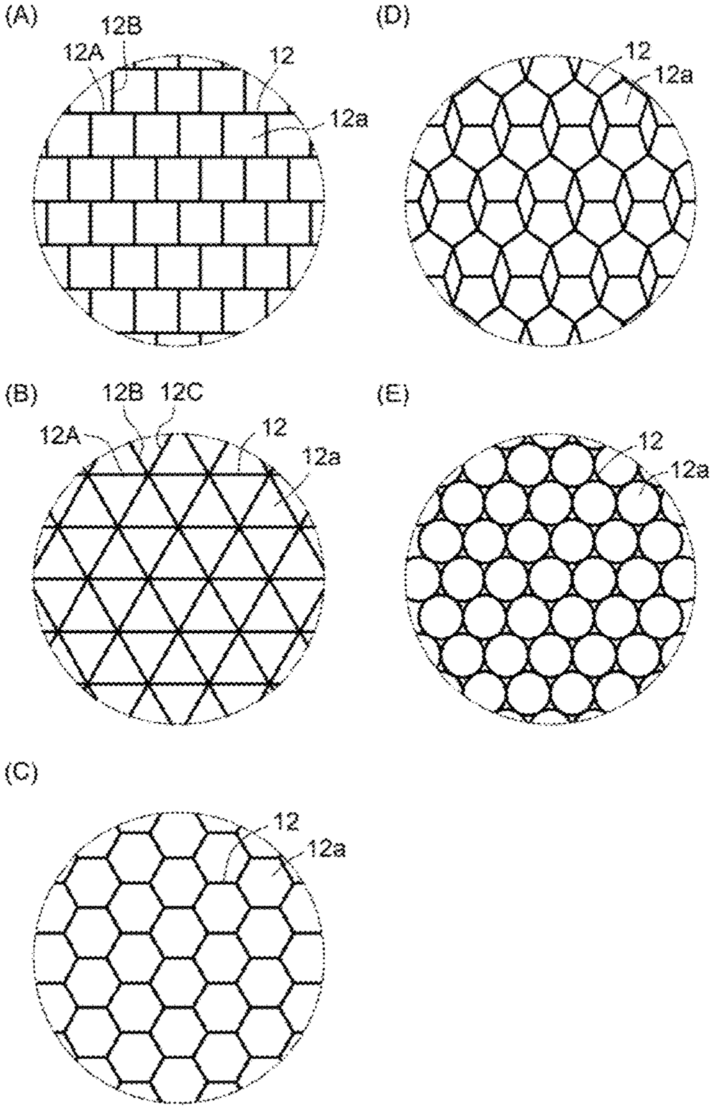
FIGS. 4(A) to (E) are cross-sectional views showing other examples of arrangement patterns of an electric conductor.

The radio wave reflector 11 produced as Example 1 was a radio wave reflector 11 having the same configuration as that of the embodiment shown in FIGS. 2 and 3. The radio wave reflector 11 had a square shape in plan view. The radio wave reflector 11 was set to a one-side length L10 of 20 cm and a thickness L1 of 0.25 mm. The thickness L1 of the radio wave reflector 11 was the sum of the thickness L3 of a conductive thin film layer 16, the thickness L2 of a substrate layer 13, the thickness L4 of an adhesive layer 14, and the thickness L5 of a protective layer 15. However, since the thickness L3 of the conductive thin film layer 16 was very thin compared to each of the thicknesses L2, L4, and L5 of the substrate layer 13, the adhesive layer 14, and the protective layer 15, the thickness L3 of the conductive thin film layer 16 was not taken into consideration when calculating the thickness L1 of the radio wave reflector 11. In the radio wave reflector 11, the maximum value of reflection intensity of a radio wave when an incident wave with a frequency of 2 GHz or more and 300 GHz or less was reflected (also referred to below as the "maximum value of radio wave reflection intensity") was −20 dB, and the total light transmittance was 90.0%. As the substrate layer 13, a synthetic resin material sheet formed of PET (Lumirror 50T60, produced by Toray Industries, Inc.) was used, and the substrate layer 13 was set to a thickness L2 of 50 μm. The electric conductor 12 of the conductive thin film layer 16 was a linear metal thin film formed of silver (Ag). The thickness (film thickness) L3 was set to 500 nm, the line width L6 was set to 0.5 μm, and the length L7 between adjacent electric conductors 12 was set to 60 μm. The conductive thin film layer 16 had a surface resistivity of 1.7Ω/□ and an electric conductor coverage of 3.3%. As the adhesive layer 14, a rubber adhesive was used. Specifically, the adhesive layer 14 was formed by placing 100 parts by weight of a rubber polymer (a mixture of 50 mass % of a styrene-(ethylene-propylene)-styrene block copolymer and 50 mass % of a styrene-(ethylene-propylene) block copolymer, styrene content: 15%, weight average molecular weight: 130000), 40 parts by weight of a synthetic resin (FMR-0150, produced by Mitsui Chemicals), 20 parts by weight of a softening agent (LV-100, produced by JX Nippon Oil & Energy Corporation), 0.5 parts by weight of an antioxidant (Adekastab AO-330, produced by ADEKA Co., Ltd.), and 150 parts by weight of toluene in a reaction vessel equipped with a cooling tube, a nitrogen inlet tube, a thermometer, a dropping funnel, and a stirrer, followed by stirring at 40° C. for 5 hours. The adhesive layer 14 was set to a thickness L4 of 150 μm. The adhesive layer 14 had a dielectric loss tangent of 0.04. As the protective layer 15, a synthetic resin sheet formed of PET (Lumirror 50T60, produced by Toray Industries, Inc.) was used. The protective layer 15 was set to a thickness L5 of 50 μm. The thickness L1 of the radio wave reflector 11, the thickness L3 of the conductive thin film layer 16, the thickness L2 of the substrate layer 13, the thickness L4 of the adhesive layer 14, and the thickness L5 of the protective layer 15 were each determined by measuring any multiple points and calculating the average value of the obtained measurement values. The thicknesses L1 to L5 may be measured, for example, by a reflectance spectroscopic film thickness analyzer (e.g., F3-CS-NIR produced by Filmetrics Japan, Inc.) as a measuring instrument.

A method for producing the radio wave reflector 11 of Example 1 is described. First, an electric conductor 12 is formed on a substrate layer 13. A core layer of 0.01 μm to 3 μm is formed on one surface of a copper foil with a thickness of 5 to 200 μm, which has sufficient strength as a metal layer, by a method such as electrolytic or electroless plating. A conductive thin film layer 16 having a predetermined arrangement pattern is then formed on the surface of the core layer by a method such as electrolytic or electroless plating. Subsequently, the entire conductive thin film layer 16 is covered with the substrate layer 13. The substrate layer 13 is pre-coated with an adhesive. The copper foil and the core layer are then removed by etching. The electric conductor 12 is thereby formed on the substrate layer 13.

Using an adhesive layer 14, a protective layer 15 is attached to the electric conductor 12 on the side opposite to the side where the substrate layer 13 is present. Using the adhesive layer 14, the protective layer 15 is attached to the electric conductor 12 on the substrate layer 13 so as not to allow air bubbles to enter. The radio wave reflector 11 is thereby produced.

Example 2

The radio wave reflector 11 produced as Example 2 was different from Example 1 in the maximum value of radio wave reflection intensity and the one-side length L10 in the shape of the radio wave reflector 11. Example 2 had a maximum value of radio wave reflection intensity of −28 dB and a one-side length L10 of 18 cm. Other configurations were the same as those of Example 1.

Example 3

The radio wave reflector 11 produced as Example 3 was different from Examples 1 and 2, and was a radio wave reflector 11 having the same configuration as that of the embodiment shown in FIG. 8. The radio wave reflector 11 had a square shape. The radio wave reflector 11 was set to a thickness L1 of 0.05 mm and a one-side length L10 of 20 cm. The radio wave reflector 11 had a maximum value of radio wave reflection intensity of −28 dB and a total light transmittance of 70.0%. As the substrate layer 13, a synthetic resin material sheet formed of PET (Lumirror 50T60, produced by Toray Industries, Inc.) was used, and the substrate layer 13 was set to a thickness L2 of 50 μm. The electric conductor 12 of the conductive thin film layer 16 was a metal thin film formed of copper. The thickness (film thickness) L3 was set to 10 nm. The conductive thin film layer 16 had a surface resistivity of 6.8Ω/□ and an electric conductor coverage of 100%.

For the formation of the electric conductor 12 on the substrate layer 13 in Example 3, for example, a roll-to-roll sputtering apparatus is used. A target including a metal (for example, copper) is attached to a cathode provided in a film-forming chamber of the sputtering apparatus. A ground shield with a size such that 5% of the cathode is concealed is provided on the cathode. The film-forming chamber of the sputtering apparatus is evacuated by a vacuum pump to reduce the pressure to, for example, $3.0\times10^{-4}$ Pa and, for example, argon gas is supplied at a predetermined flow rate (100 sccm). In this state, the substrate layer 13 is conveyed to a position under the cathode, for example, at a conveying speed of 0.1 m/min and a tension of 100 N. A pulsed power of 5 kW is supplied from a bipolar power supply connected to the cathode, whereby the metal is ejected from the target and deposited on the surface of the substrate layer 13, thus forming a metal thin film.

Whether or not the metal thin film is formed with a desired thickness is evaluated, for example, by the following procedure. Indentations that penetrate the metal thin film at predetermined locations (about 30 locations in this embodiment) are formed, for example, using a nanoindenter (TI950, produced by Hysitron, Inc.). Using a laser microscope (VK-X1000/1050, produced by Keyence Corporation), the thickness of the metal thin film is measured from the gap created by each indentation. The average film thickness and standard deviation are obtained from the measurement values obtained at about 30 locations. Whether or not the average film thickness is the desired thickness L3, and whether or not the variation in the measurement values is within the desired range (for example, the standard deviation is within 5) are evaluated.

Example 4

The radio wave reflector 11 produced as Example 4 was different from Example 1 in the configuration of the protective layer 15. The protective layer 15 was a synthetic resin material sheet formed of PET in which the upper and lower surfaces had been subjected to anti-glare treatment (AG treatment). In Example 4, product number N7BB produced by KIMOTO Co., Ltd. was used, and the protective layer 15, which had been subjected to anti-glare treatment (AG treatment), had a hard coating to withstand the normal use of the radio wave reflector 11. The protective layer 15 had a thickness L5 of 188 μm.

The radio wave reflector 11 had a thickness L1 of 0.388 μm, a maximum value of radio wave reflection intensity of −20 dB, and a total light transmittance of 83.6%. Other configurations were the same as those of Example 1.

Example 5

The radio wave reflector 11 produced as Example 5 was different from Example 1 in the configuration of the protective layer 15. The protective layer 15 was a synthetic resin material sheet formed of PET in which the upper surface had been subjected to anti-glare treatment. In Example 5, product number PFN18 507HA4 produced by Daicel Corporation was used. The protective layer 15 had a thickness L5 of 188 μm.

The radio wave reflector 11 had a thickness L1 of 0.388 μm, a maximum value of radio wave reflection intensity of −20 dB, and a total light transmittance of 83.7%. Other configurations were the same as those of Example 1.

Example 6

The radio wave reflector 11 produced as Example 6 was different from Example 1 in the configuration of the protective layer 15. The protective layer 15 was a synthetic resin material sheet formed of PET in which the upper surface had been subjected to anti-reflection treatment (AR treatment). In Example 6, product number PFN10 507CAS produced by Daicel Corporation was used. The protective layer 15 had a thickness L5 of 100 μm.

The radio wave reflector 11 had a thickness L1 of 0.3 μm, a maximum value of radio wave reflection intensity of −20 dB, and a total light transmittance of 84.6%. Other configurations were the same as those of Example 1.

Example 7

The radio wave reflector 11 produced as Example 7 was different from Example 1 in the configuration of the protective layer 15. The protective layer 15 was a synthetic resin material sheet formed of PET in which the upper surface had been subjected to anti-reflection treatment (AR treatment). In Example 7, product number Scotchtint LR2CLARX produced by 3M Company was used. The protective layer 15 had a thickness L5 of 76 μm.

The radio wave reflector 11 had a thickness L1 of 0.276 μm, a maximum value of radio wave reflection intensity of −20 dB, and a total light transmittance of 92.0%. Other configurations were the same as those of Example 1.

Example 8

The radio wave reflector 11 produced as Example 8 was different from Example 1 in the adhesive layer 14. As the adhesive layer 14, an acrylic adhesive was used. The acrylic adhesive was obtained by the following procedure. Specifically, 40 parts by mass of monofunctional long-chain urethane acrylate (PEM-X264, produced by AGC Inc., molecular weight: 10000) and 60 parts by mass of acrylic monomer (35 parts by mass of 2-ethylhexyl acrylate (2EHA), 10 parts by mass of cyclohexyl acrylate (CHA), 10 parts by mass of 2-hydroxyethyl acrylate (2HEA), and 5 parts by mass of dimethylacrylamide (DMAA)) were mixed and stirred. Subsequently, 0.5 parts by mass of a crosslinking agent (1.6-hexanediol diacrylate (A-HD-N, produced by Shin Nakamura Chemical Co., Ltd.)) and a photopolymerization initiator (Omnirad 651 (produced by IGM Japan G. K.)) were added to the resulting (meth)acrylic acid ester copolymer solution, based on 100 parts by mass of the solids content of the (meth)acrylic acid ester copolymer. The mixture was then stirred and defoamed by vacuum. The acrylic adhesive was thereby produced.

Comparative Example 1

The radio wave reflector produced as Comparative Example 1 was different from Example 1 in the following respects. The total light transmittance of the radio wave reflector was 62.0%. The electric conductor 12 of the conductive thin film layer 16 was formed of copper and had a line width L6 of 5 μm. The conductive thin film layer 16 had a surface resistivity of 1.1Ω/□ and an electric conductor coverage of 30.6%. Other configurations were the same as those of Example 1.

Comparative Example 2

The radio wave reflector produced as Comparative Example 2 was different from Example 3 in the following respects. The maximum value of radio wave reflection intensity was −20 dB, and the total light transmittance was 60.0%. The conductive thin film layer 16 was set to a thickness (film thickness) L3 of 15 nm. The conductive thin film layer 16 had a surface resistivity of 2.8Ω/□. Other configurations were the same as those of Example 3.

Comparative Example 3

The radio wave reflector produced as Comparative Example 3 was different from Example 3 in the following respects. The maximum value of radio wave reflection intensity was −40 dB, and the total light transmittance was 80.0%. The conductive thin film layer 16 was set to a thickness (film thickness) L3 of 2.5 nm. The conductive thin film layer 16 had a surface resistivity of 9.8Ω/□. Other configurations were the same as those of Example 3.

TABLE 1

| | | Ex. 1 | Ex. 2 | Ex. 3 | Ex. 4 | Ex. 5 | Ex. 6 | Ex. 7 | Ex. 8 |
|---|---|---|---|---|---|---|---|---|---|
| Substrate layer | Thickness of substrate layer (μm) | 50 | 50 | 50 | 50 | 50 | 50 | 50 | 50 |
| Conductive thin film layer | Surface resistivity of conductive thin film layer (Ω/□) | 1.7 | 1.7 | 6.8 | 1.7 | 1.7 | 1.7 | 1.7 | 1.7 |
| | Material of electric conductor | Silver | Silver | Copper | Silver | Silver | Silver | Silver | Silver |
| | Electric conductor coverage (%) | 3.3 | 3.3 | 100 | 3.3 | 3.3 | 3.3 | 3.3 | 3.3 |
| | Thickness of conductive thin film layer (nm) | 500 | 500 | 10 | 500 | 500 | 500 | 500 | 500 |
| | Line width of electric conductor (μm) | 0.5 | 0.5 | — | 0.5 | 0.5 | 0.5 | 0.5 | 0.5 |
| Adhesive layer | Thickness of adhesive layer (μm) | 150 | 150 | — | 150 | 150 | 150 | 150 | 150 |
| | Type of adhesion | Rubber | Rubber | — | Rubber | Rubber | Rubber | Rubber | Acrylic |
| Protective layer | Thickness of protective layer (μm) | 50 | 50 | — | 188 | 188 | 100 | 76 | 50 |
| | Treatment of protective layer | — | — | — | AG treatment (both surfaces) | AG treatment (Upper surface) | AR treatment (Upper surface) | AR treatment (Upper surface) | — |
| Radio wave reflector | Thickness of radio wave reflector (mm) | 0.25 | 0.25 | 0.05 | 0.388 | 0.388 | 0.3 | 0.276 | 0.25 |
| | One-side length of radio wave reflector (cm) | 20 | 18 | 20 | 20 | 20 | 20 | 20 | 20 |
| | Maximum value of radio wave reflection intensity (dB) at 3 to 300 GHz | −20 | −28 | −28 | −20 | −20 | −20 | −20 | −20 |
| | Frequency band (GHz) in which radio wave reflection intensity is −30 dB or more | 3 to 300 | 3 to 300 | 3 to 300 | 3 to 300 | 3 to 300 | 3 to 300 | 3 to 300 | 3 to 300 |
| | Total light transmittance (%) | 90.0 | 90.0 | 70.0 | 83.6 | 83.7 | 84.6 | 92.0 | 90.0 |
| Evaluation | Scenery visibility (A/B/C) | A | A | B | B | B | B | B | A |
| | Radio wave extensibility to blind spots (A/B/C) | A | B | B | A | A | A | A | C |
| | Anti-glare properties (A/B/C) | C | C | C | B | B | A | A | C |

TABLE 2

| | | Comp. Ex. 1 | Comp. Ex. 2 | Comp. Ex. 3 |
|---|---|---|---|---|
| Substrate layer | Thickness of substrate layer (μm) | 50 | 50 | 50 |
| Conductive thin film layer | Surface resistivity of conductive thin film layer (Ω/□) | 1.1 | 2.8 | 9.8 |
| | Material of electric conductor | Copper | Copper | Copper |
| | Electric conductor coverage (%) | 30.6 | 100 | 100 |
| | Thickness of conductive thin film layer (nm) | 500 | 15 | 2.5 |
| | Line width of electric conductor (μm) | 5 | — | — |
| Adhesive layer | Thickness of adhesive layer (μm) | 150 | — | — |
| | Type of adhesion | Rubber | — | — |
| Protective layer | Thickness of protective layer (μm) | 50 | — | — |
| | Treatment of protective layer | — | — | — |
| Radio wave reflector | Thickness of radio wave reflector (mm) | 0.25 | 0.05 | 0.05 |
| | One-side length of radio wave reflector (cm) | 20 | 20 | 20 |
| | Maximum value of radio wave reflection intensity (dB) at 3 to 300 GHz | −20 | −20 | −40 |
| | Frequency band (GHz) in which radio wave reflection intensity is −30 dB or more | 3 to 300 | 3 to 300 | — |
| | Total light transmittance (%) | 62.0 | 60.0 | 80.0 |
| Evaluation | Scenery visibility (A/B/C) | C | C | B |
| | Radio wave extensibility to blind spots (A/B/C) | A | A | C |
| | Anti-glare properties (A/B/C) | C | C | C |

Methods for Measuring Reflection Intensity, Total Light Transmittance, and Surface Resistivity For Examples 1 to 8 and Comparative Examples 1 to 3 (also collectively referred to as the "sample"), which were measurement targets, the intensity of reflective waves and the frequency at which the reflection intensity was −30 dB or more were measured according to the method for measuring the amount of reflection described in JIS R 1679: 2007. A vector network analyzer (E5061B LF-RF, produced by Agilent Technologies, Inc.) was used, and a rectangular horn antenna was used as the receiving antenna. The sample, the receiving antenna, and the transmitting antenna were placed on the same plane, and the distance between the sample and the receiving antenna, and the distance between the sample and the transmitting antenna, were set to 1 m. The incident angle θ1 of a radio wave and the reflection angle θ2 with respect to the sample were set to 45 degrees. From the transmitting antenna, radio waves with varying frequencies from 2 GHz to 300 GHz (radio wave at 2 GHz, radio wave at 3 GHz, radio wave at 5 GHz, and radio wave at 30 GHz and above in 30 GHz increments up to 300 GHz (i.e., 30, 60, 90, 120, . . . , and 300 GHz)) were output, and the reflection intensity of radio waves at each frequency was measured. In this measurement, coaxial cables of the receiving antenna and the transmitting antenna were directly connected by the vector network analyzer, and the signal level at each frequency was calibrated to 0. The device was then reconfigured and the measurement was performed. The reflection intensity of the sample at each frequency was measured as the attenuation amount of the signal level from the zero point. When the frequency of radio waves was 10 GHz or less, the sample was irradiated with a plane wave appropriately using a millimeter wave lens in consideration of the first Fresnel radius of the rectangular horn antenna.

The total light transmittance was measured using standard illuminant D65 (a standard light source specified by the CIE (International Commission on Illumination)) in accordance with the method specified in JIS K 7375:2008.

The surface resistivity was measured in accordance with the four-terminal method specified in JIS K 6911 by bringing measurement terminals into contact with the surface of the conductive thin film layer 16 while the formed conductive thin film layer 16 was exposed during the production of Examples 1 to 8 and Comparative Examples 1 to 3.

Evaluation Indices

Three evaluation indices for scenery visibility, radio wave extensibility to blind spots, and anti-glare properties were set.

Scenery Visibility

The scenery visibility is an index for evaluating transparency of the radio wave reflector 11 and the degree to which the arrangement pattern of the electric conductor 12 of the conductive thin film layer 16 is visually recognized. The transparency is evaluated by placing the radio wave reflector 11 on a piece of paper with written letters and determining whether or not the letters are visually recognizable when the radio wave reflector 11 is viewed from the upper side of the radio wave reflector 11. The degree to which the arrangement pattern of the electric conductor 12 of the conductive thin film layer 16 is visually recognized is evaluated as follows. A light source is placed at a position 0.5 m away from the radio wave reflector 11, and the radio wave reflector 11 is irradiated with light rays. The radio wave reflector 11 is visually observed from a position that is 0.5 m away from the radio wave reflector 11 and that is on the side opposite to the side where the light source is provided, sandwiching the radio wave reflector 11, and whether or not the arrangement pattern of the electric conductor 12 is visually recognized is evaluated. The scenery visibility is evaluated as "A" when the letters are visually recognizable, and also when the arrangement pattern of the electric conductor 12 is not visually recognized even with irradiation with light rays from any of a light-emitting diode (LED), fluorescent lamp, and incandescent bulb as the light source. The scenery visibility is evaluated as "B" when the letters are visually recognizable, and also when the arrangement pattern of the electric conductor 12 is visually recognized with irradiation with light rays from an LED but is not visually recognized with irradiation with light rays from a fluorescent lamp. The scenery visibility is evaluated as "C" when the letters are not visually recognizable, or when the arrangement pattern of the electric conductor 12 is visually recognized with irradiation of light rays from both an LED and a fluorescent lamp as the light source. A rating of "A" or "B" means that the radio wave reflector 11 is applicable to practical use in terms of scenery visibility.

Radio Wave Extensibility to Blind Spots

Figure 10:
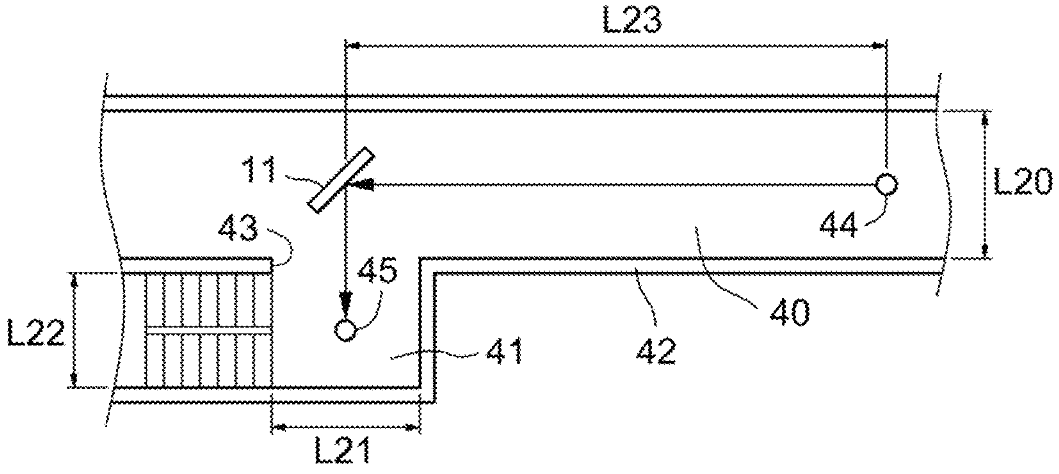
FIG. 10 is an explanatory drawing illustrating a method for measuring radio wave extensibility to blind spots.
Figure 11:
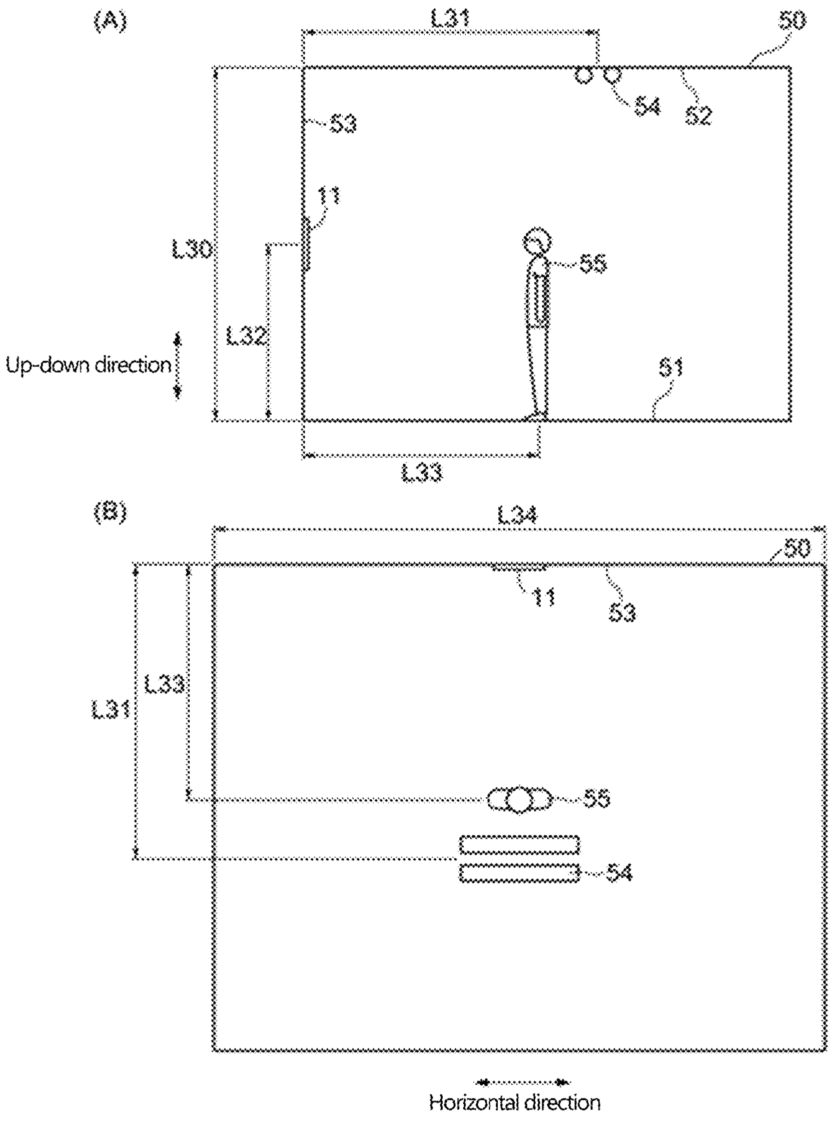
FIG. 11 is explanatory drawings illustrating a method for evaluating anti-glare properties. (A) is a side view of a room and (B) is a plan view of the room.

The radio wave extensibility to blind spots is an index for evaluating whether or not reflective waves reflected from the radio wave reflector 11 can be sufficiently received by a receiver 21 in a building with a blind spot. As shown in FIG. 10, a test was conducted in a reinforced concrete building by using a corridor 40 and a stair landing 41 that projects perpendicular to the direction in which the corridor 40 extends. The stair landing 41 is a rectangular shape in plan view and is provided continuously from the opening portion 43 in the side wall 42 of the corridor 40. The corridor 40 has a width L20 of about 2 m. The length of the opening portion 43 along the extending direction of the corridor 40, i.e., the length L21 of the stair landing 41 along the extending direction of the corridor 40, is about 3 m. The depth (the length from the opening portion 43 to the wall facing the opening portion 43) L22 of the stair landing 41 is about 2 m.

The radio wave reflector 11 is installed so that, in plan view, the center of gravity thereof is positioned at the center of the corridor 40 in the width direction and at the center of the opening portion 43 in the side wall 42 of the corridor 40 in the extending direction. The radio wave reflector 11 is installed upright so that the surface on which radio waves are incident is vertical to the floor of the corridor 40. In plan view, the transmitting antenna 44, which is a radio wave source, is installed at the center of the corridor 40 in the width direction and away from the radio wave reflector 11 at a distance L23. The distance L23 is set to 5 m. The receiving antenna 45, which receives radio waves from the transmitting antenna 44, is installed at the center of the stair landing 41 in plan view. The transmitting antenna 44, the receiving antenna 45, and the radio wave reflector 11 are installed by using a laser level so that the plane including the center of gravity of the transmitting antenna 44, the center of gravity of the receiving antenna 45, and the center of gravity of the radio wave reflector 11 is parallel to the floor of the corridor 40. The distance between the floor and the plane is 1.0 m. The direction of the surface of the radio wave reflector 11 on which radio waves are incident is such that the incident angle θ1 and the reflection angle θ2 of radio waves with respect to the radio wave reflector 11 are 45 degrees.

The measurement was performed by outputting a radio wave at a frequency of 28.5 GHz from the transmitting antenna 44. In this measurement, coaxial cables of the receiving antenna 45 and transmitting antenna 44 were directly connected by a vector network analyzer, and the signal level was calibrated to 0. The device was then reconfigured and the measurement was performed. Radio waves output from the transmitting antenna 44 were reflected from the radio wave reflector 11 and received by the receiving antenna 45. The reflection intensity of radio waves received by the receiving antenna 45 was measured as the attenuation amount of the signal level from the zero point. The radio wave extensibility to blind spots was evaluated as "A" when the intensity was −25 dB or more. The radio wave extensibility to blind spots was evaluated as "B" when the intensity was −30 dB or more. The radio wave extensibility to blind spots was evaluated as "C" when the intensity was less than −30 dB. A rating of "A" or "B" means that the radio wave reflection intensity is a practical intensity for use.

Anti-Glare Properties

The anti-glare properties are an index for indicating the degree of glare from the light source on the surface of the radio wave reflector 11. The anti-glare properties are evaluated as follows. As shown in FIGS. 11(A) and 11(B), a rectangular room 50 with a wall 53, a ceiling 52, and a floor 51 is prepared. The distance L30 between the floor 51 and the ceiling 52 is 3 m, and two straight-tube fluorescent lamps 54, 54, each having a length of 1119 mm, are mounted in parallel in the center portion of the ceiling 52. The distance L31 between the center position between the two fluorescent lamps 54, 54 and the wall 53, which is parallel to the fluorescent lamps 54, 54, is 2.5 m. The length L34 of the wall 53 in the horizontal direction is 4 m. Each of the radio wave reflectors 11 of Examples 1 to 8 and Comparative Example 1 to 3 was attached with double-sided tape to the center position of the wall 53 in the horizontal direction. An evaluator 55 is standing at the center of the floor 51 in the horizontal direction and apart from the wall 53 at a distance L33. The distance L33 is 2 m. The distance L32 between the center position of the radio wave reflector 11 in the up-down direction and the floor surface 51 is 1.5 m. The center position of the radio wave reflector 11 in the up-down direction is almost at the same level as the eye level of the evaluator 55. The evaluator 55, the center position of the radio wave reflector 11 in the horizontal direction, and the center position of the fluorescent lamps in the length direction, are aligned in a row perpendicular to the horizontal direction in plan view as shown in FIG. 11(B). In the room 50 described here, the evaluator 55 evaluated the degree of glare from the fluorescent lamps 54, 54 on the surface of the radio wave reflector 11. The anti-glare properties were evaluated as "C" when the fluorescent lamps 54, 54 were reflected in the radio wave reflector 11 and the shape of the fluorescent lamps 54, 54, including the outline of the fluorescent lamps 54, 54, was visually recognized, and also when the light emitted by the fluorescent lamps 54, 54 was visually recognized. The anti-glare properties were evaluated as "B" when the outline and shape of the fluorescent lamps 54, 54 were not visually recognized, but the light emitted by the fluorescent lamps 54, 54 was visually recognized. The anti-glare properties were evaluated as "A" when the outline and shape of the fluorescent lamps 54, 54, as well as the light emitted by the fluorescent lamps 54, 54, were not visually recognized. A rating of "A" or "B" means that the radio wave reflector 11 is applicable to practical use in terms of anti-glare properties.

Evaluation Results

Tables 1 and 2 show the evaluation results. In Example 1, the total light transmittance was as high as 90%, and the scenery visibility was evaluated as "A" since the letters were visually recognizable while the arrangement pattern of the electric conductor 12 was not visually recognized. Further, the test for the radio wave extensibility to blind spots was evaluated as "A" since the reflection intensity of radio waves received by the receiver 21 was −25 dB or more. Although Example 8 was different from Example 1 in the type of the adhesive, the results were the same as those of Example 1. In contrast, in Comparative Example 1, in which the structure was the same as those of Examples 1 and 2, the material of the electric conductor was copper, the electric conductor coverage was higher than that of Example 1, and the total light transmittance was 62%, which was lower than that of Example 1. Therefore, in Comparative Example 1, while the radio wave extensibility to blind spots was evaluated as "A," the scenery visibility was evaluated as "C." Thus, Example 1 was more excellent than Comparative Example 1 in terms of scenery visibility.

In Example 2, the one-side length L10 of the radio wave reflector 11 was set to be shorter than that of Example 1, the total light transmittance was as high as 90%, the letters were visually recognizable, the arrangement pattern of the electric conductor 12 was not visually recognized, and the scenery visibility was evaluated as "A." In the test for radio wave extensibility to blind spots, Example 2 was evaluated as "B" since the radio wave reflection intensity was −30 dB or more. In contrast, in Comparative Example 1, the scenery visibility was evaluated as "C" as stated above; thus, Example 2 was more excellent than Comparative Example 1 in terms of scenery visibility.

In Example 3, the conductive thin film layer 16 had a small thickness, and the total light transmittance was as high as 70%. The scenery visibility was evaluated as "B," and the radio wave extensibility to blind spots was evaluated as "B" since the radio wave reflection intensity was −30 dB or more. In contrast, in Comparative Example 2, which had the same structure as that of Example 3, the conductive thin film layer 16 had a thickness greater than that of Example 3, and the total light transmittance was 60%. Although the radio wave extensibility to blind spots was evaluated as "A," the scenery visibility was evaluated as "C." In Comparative Example 3, which had the same structure as that of Example 3, the conductive thin film layer 16 had a thickness smaller than that of Example 3. Although the scenery visibility was evaluated as "B," the radio wave reflection intensity was low, and the radio wave extensibility to blind spots was evaluated as "C."

In Example 4, both the upper and lower surfaces of the protective layer 15 were subjected to AG treatment, and in Example 5, the upper surface of the protective layer 15 was subjected to AG treatment. In Examples 4 and 5, the anti-glare properties were evaluated as "B." Further, in Examples 4 and 5, the thickness L10 of the radio wave reflector 11 was greater than that of Examples 1 to 3, the scenery visibility was evaluated as "B," and the radio wave extensibility to blind spots was evaluated as "A." In Examples 6 and 7, the upper surface of the protective layer 15 was subjected to AR treatment, and the thickness L5 of the protective layer 15 of Example 6 was set to be greater than that of Example 7. In Examples 6 and 7, the anti-glare properties were evaluated as "A." Further, in Examples 6 and 7, the thickness L10 of the radio wave reflector 11 was greater than that of Examples 1 to 3, the scenery visibility was evaluated as "B," and the radio wave extensibility to blind spots was evaluated as "A." In Examples 1 to 3 and Comparative Examples 1 to 3, the protective layer 15 was not subjected to AG treatment or AR treatment, and the anti-glare properties were evaluated as "C."

Embodiments of the present invention have been described above. However, the present invention is not limited to the above-described embodiments. Various modifications are possible without departing from the gist of the present invention. The dimensions, materials, shapes, relative positions, and the like of components described as embodiments or shown in the drawings are not intended to limit the scope of the present invention but are merely illustrative examples. For example, expressions that describe a relative or absolute arrangement, such as "in a specific direction," "along a specific direction," "parallel," "perpendicular," "center," "concentric," or "coaxial" not only describe strictly such an arrangement but also describe a state with a relative displacement with a tolerance or with an angle or distance to the extent that the same functions can be obtained. For example, expressions that describe things being in an equal state, such as “same,” “equal,” and “homogeneous” not only describe strictly an equal state but also a state with a tolerance or a difference to the extent that the same functions can be obtained. For example, expressions representing square, cylindrical, or other shapes not only represent square, cylindrical, or other shapes in the strict geometric sense, but also represent shapes that include uneven portions, chamfers, etc. to the extent that the same effect can be obtained. The expressions “having,” “consisting of,” “comprising,” “including,” and “containing” one component are not exclusive expressions that exclude the presence of other components.

In the present specification, expressions with “substantially” such as “substantially parallel” and “substantially perpendicular” may be used. For example, “substantially parallel” means substantially “parallel” and includes not only a strictly “parallel” state but also a state with an error of a few degrees. The same applies to other expressions with “substantially.”

Further, in the present invention, expressions such as “edge portion” and “edge” are used, which are distinguished from each other based on the presence or absence of “ . . . portion.” For example, “edge” means the end of an object, while “edge portion” means an area with a specific range that includes the “edge.” Any point that is within a specific range, including the edge, is defined as “edge portion.” The same applies to other expressions with “ . . . portion.”

DESCRIPTION OF REFERENCE NUMERALS

11: radio wave reflector
12: electric conductor
13: substrate layer
14: adhesive layer
15: protective layer
16: conductive thin film layer
L6: line width of the electric conductor
L10: one-side length of the radio wave reflector

The invention claimed is:

1. A radio wave reflector for reflecting radio waves,
the intensity of a reflective wave as specular reflection of an incident wave being-30 dB or more relative to the intensity of the incident wave at a frequency, and
the radio wave reflector having a total light transmittance of 65% or more as measured using a standard illuminant D65.

2. The radio wave reflector according to claim 1, wherein the incident wave has any frequency of 2 GHz or more and 300 GHz or less.

3. The radio wave reflector according to claim 1, wherein
the radio wave reflector comprises a conductive thin film layer comprising an electric conductor for reflecting radio waves, a substrate layer comprising a substrate, a protective layer comprising a protective material for protecting the conductive thin film layer, and an adhesive layer comprising an adhesive for bonding the conductive thin film layer and the protective layer, and
the substrate layer, the conductive thin film layer, the adhesive layer, and the protective layer are laminated in this order.

4. The radio wave reflector according to claim 3, wherein the conductive thin film layer has a surface resistivity of 3.5Ω/□ or less and a thickness of 500 nm or less.

5. The radio wave reflector according to claim 3, wherein in the conductive thin film layer, regions without the electric conductor surrounded by one or a plurality of the electric conductors that are linear are periodically arranged at predetermined intervals.

6. The radio wave reflector according to claim 5, wherein the conductive thin film layer has an electric conductor coverage of 1% or more and 10% or less, the electric conductor coverage being defined as the percentage of the area occupied by the electric conductor per unit area.

7. The radio wave reflector according to claim 5, wherein the electric conductor has a line width of 0.1 μm or more and 4.0 μm or less.

8. The radio wave reflector according to claim 3, wherein the protective layer is subjected to anti-glare treatment or anti-reflection treatment.

9. The radio wave reflector according to claim 1, wherein the overall shape of the radio wave reflector is a polygonal shape having a one-side length of 15 cm or more.

* * * * *